(12) United States Patent
Greve et al.

(10) Patent No.: US 11,849,751 B2
(45) Date of Patent: Dec. 26, 2023

(54) BULK FOOD PROCESSOR WITH ANGLED AXIAL FLOW FAN

(71) Applicant: Laitram, L.L.C., Harahan, LA (US)

(72) Inventors: Christopher G. Greve, Covington, LA (US); Robert S. Lapeyre, New Orleans, LA (US); Kyle J. Sedlacek, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 18/106,722

(22) Filed: Feb. 7, 2023

(65) Prior Publication Data

US 2023/0172256 A1 Jun. 8, 2023

Related U.S. Application Data

(63) Continuation of application No. 16/768,993, filed as application No. PCT/US2018/065179 on Dec. 12, 2018, now Pat. No. 11,576,419.

(60) Provisional application No. 62/597,993, filed on Dec. 13, 2017.

(51) Int. Cl.
*A23P 30/00* (2016.01)
*F26B 15/18* (2006.01)
*F26B 21/02* (2006.01)
*F26B 21/12* (2006.01)

(52) U.S. Cl.
CPC ........... *A23P 30/00* (2016.08); *F26B 15/18* (2013.01); *F26B 21/028* (2013.01); *F26B 21/12* (2013.01)

(58) Field of Classification Search
CPC ........ F26B 15/18; F26B 21/028; F26B 20/12; A23P 30/00

USPC ............................................. 34/216
See application file for complete search history.

(56) References Cited

U.S. PATENT DOCUMENTS

| 108,949 A | 11/1870 | Wheeler |
| 1,345,055 A | 6/1920 | Willour |
| 2,100,994 A | 11/1937 | Cohen |
| 2,876,763 A * | 3/1959 | Hunter ............. F23D 11/10 126/110 B |

(Continued)

FOREIGN PATENT DOCUMENTS

| CA | 2790084 A1 | 9/2011 |
| CN | 101390647 A | 3/2009 |

(Continued)

OTHER PUBLICATIONS

Written Opinion of the International Searching Authority, International Search Report for International Application No. PCT/US2017/043013, dated Oct. 27, 2017, Korean Intellectual Property Office, Republic of Korea.

(Continued)

*Primary Examiner* — Stephen M Gravini
(74) *Attorney, Agent, or Firm* — Catherine M. Bishop

(57) ABSTRACT

Apparatus and methods for bulk processing items on a conveyor belt using an angled axial fan that extends obliquely into a processing chamber and includes a curved back wall forming an air flow chamber. The angled axial fan enhances air flow around a product being processed on the conveyor belt. A heater employs shrouds and a series of baffle plates held together using a connecting pin to heat circulated air in a low-pressure area below the conveyor belt. Baffles in an upper chamber mix and direct heated, circulated air over the conveyed product.

20 Claims, 23 Drawing Sheets

(56) References Cited

U.S. PATENT DOCUMENTS

| | | | |
|---|---|---|---|
| 3,947,241 A | 3/1976 | Caridis et al. | |
| 4,022,548 A | 5/1977 | McLarty | |
| 4,313,417 A * | 2/1982 | Briggs | F24H 3/0488 |
| | | | 126/110 B |
| 4,344,358 A | 8/1982 | Maurer | |
| 4,463,504 A * | 8/1984 | Applegate | F26B 17/122 |
| | | | 432/2 |
| 4,506,655 A | 3/1985 | Kuechler | |
| 4,757,800 A * | 7/1988 | Shei | A21B 1/245 |
| | | | 34/223 |
| 4,817,582 A * | 4/1989 | Oslin | F24C 15/322 |
| | | | 126/91 A |
| 5,025,775 A | 6/1991 | Crisp | |
| 5,040,974 A | 8/1991 | Lanham et al. | |
| 5,050,578 A | 9/1991 | Luebke et al. | |
| 5,161,952 A | 11/1992 | Eggers, Jr. | |
| 5,638,609 A * | 6/1997 | Chandran | F26B 23/026 |
| | | | 34/379 |
| 6,106,276 A | 8/2000 | Sams et al. | |
| 6,146,678 A | 11/2000 | Caridis et al. | |
| 6,219,937 B1 * | 4/2001 | Culp | F26B 21/02 |
| | | | 432/103 |
| 6,250,797 B1 | 6/2001 | Weetman | |
| 6,655,373 B1 | 12/2003 | Wiker | |
| 7,285,299 B1 | 10/2007 | Howard | |
| 7,654,011 B2 * | 2/2010 | Ronning | F26B 23/022 |
| | | | 34/477 |
| 7,694,432 B2 | 4/2010 | Eriksson et al. | |
| D619,698 S | 7/2010 | Emenheiser et al. | |
| 7,785,064 B2 | 8/2010 | Bartholmey et al. | |
| 7,802,398 B2 * | 9/2010 | Kulkarni | A01M 1/023 |
| | | | 43/132.1 |
| 7,820,216 B1 | 10/2010 | Gavin et al. | |
| 7,841,103 B2 | 11/2010 | Hada et al. | |
| 7,971,369 B2 | 7/2011 | Studebaker | |
| 8,172,088 B2 | 5/2012 | Vedsted et al. | |
| 8,640,360 B2 | 2/2014 | Stamm et al. | |
| 8,707,861 B2 | 4/2014 | Gunawardena et al. | |
| 9,052,141 B2 | 6/2015 | Andrisin et al. | |
| 9,121,638 B2 | 9/2015 | Black et al. | |
| 9,863,698 B1 | 1/2018 | Turner | |
| 11,576,419 B2 * | 2/2023 | Greve | A23P 30/00 |
| 2004/0177769 A1 | 9/2004 | Kobayashi | |
| 2006/0147594 A1 | 7/2006 | Long et al. | |
| 2010/0139641 A1 | 6/2010 | Distaso et al. | |
| 2013/0186387 A1 | 7/2013 | Wiker et al. | |
| 2014/0053424 A1 | 2/2014 | Schreiber et al. | |
| 2017/0127715 A1 | 5/2017 | Kovacs et al. | |
| 2020/0329753 A1 | 10/2020 | Greve et al. | |

FOREIGN PATENT DOCUMENTS

| | | | | |
|---|---|---|---|---|
| CN | 103622130 A | | 3/2014 | |
| CN | 104457191 A | | 3/2015 | |
| EP | 0728995 A2 | | 8/1996 | |
| EP | 1256281 A1 | | 11/2002 | |
| EP | 2729707 B1 | | 11/2015 | |
| EP | 2544831 B1 | | 1/2016 | |
| EP | 3723515 A1 | * | 10/2020 | A23B 9/025 |
| JP | H0530952 A | | 2/1993 | |
| JP | 2002253113 A | | 10/2002 | |
| JP | 2014117164 A | | 6/2014 | |
| WO | 2004076928 A2 | | 9/2004 | |
| WO | 2011112312 A3 | | 3/2012 | |
| WO | 2015133981 A1 | | 9/2015 | |
| WO | 2019118580 A1 | | 6/2019 | |

OTHER PUBLICATIONS

European Search Report for European Patent Application No. 17831854.9, dated Jan. 23, 2020, European Patent Office, Munich, DE.

European Search Report for European Patent Application No. 18888218.7, dated Sep. 23, 2021, European Patent Office, Munich, Germany.

Office Action/Search Report, Chinese Patent Application No. 2017800440592, dated Dec. 21, 2021, China National Intellectual Property Administration.

Second Office Action/Search Report, Chinese Patent Application No. 2017800440592, dated Apr. 23, 2022, China National Intellectual Property Administration.

* cited by examiner

BULK FOOD PROCESSOR WITH ANGLED AXIAL FLOW FAN

RELATED APPLICATIONS

The present invention is a continuation of U.S. patent application Ser. No. 16/768,993, which entered the US National Phase on Jun. 2, 2020 and is a § 371 application of PCT/US2018/065170, which claims priority to U.S. Provisional Patent Application Ser. No. 62/597,993, entitled "Bulk Food Processor with Angled Axial Flow Fan", filed Dec. 13, 2017, the contents of which are herein incorporated by reference.

BACKGROUND

The invention relates generally to a processor for articles, such as food articles, and more particularly to apparatus and methods for pasteurizing food.

In preparing foods or other items in bulk, the items may be conveyed through a processing chamber using a conveyor belt. A process, such as heating, cooling or steaming of the articles may be performed. For example, it may be desirable to pasteurize nuts, such as almonds, in bulk using a conveyor belt. Pasteurization may involve heating and—or cooling the nuts using heated or cooled air circulated over the conveyed nuts. It may be desirable to enhance the flow of air in certain processing chambers to make the processing of articles more efficient.

SUMMARY

A bulk food processor employs an angled axial flow fan to circulate air over a product conveyed through a processing chamber. Product is conveyed through the processing chamber by a conveyor belt and heated air is circulated to process the product. The angled axial fan has a curved rear wall to facilitate air flow. A heater employs shrouds and a series of baffle plates held together using a connecting pin to heat circulated air in a low-pressure area below the conveyor belt. Baffles in an upper portion of the processing chamber mix and direct heated, circulated air over the conveyed product.

According to one aspect, a bulk processor for an item comprises a processing chamber having a product inlet and a product outlet, a conveyor for conveying product through the processing chamber from the product inlet to the product outlet and an axial flow fan for circulating air around the product. The axial flow fan has a back wall forming an air flow chamber for directing air from below the conveyor to a high-pressure region above the conveyor.

According to another aspect, a bulk processor comprises a processing chamber having a product inlet and a product outlet, a conveyor extending longitudinally through the processing chamber for conveying product through the processing chamber from the product inlet to the product outlet, a fan for circulating air from below the conveyor to a high-pressure region above the conveyor and a plurality of baffles extending longitudinally above the conveyor for mixing the circulated air and directing an even flow of air over the conveyor.

According to still another aspect, a bulk processor for an item comprises a processing chamber having a product inlet and a product outlet, a conveyor for conveying product through the processing chamber from the product inlet to the product outlet, a fan for circulating air from below the conveyor to a high-pressure region above the conveyor and a heater below the conveyor for heating air circulated by the fan. The heater comprises a natural gas burner comprising a housing mounted outside of the processing chamber, a flame tube extending from the housing through a side wall of the processing chamber into an interior of the processing chamber, openings to allow air intake to the flame tube from outside the processing chamber, an inner shroud surrounding the flame tube and having peripheral openings, and an outer shroud surrounding the inner shroud.

According to yet another aspect, an axial fan for circulating air comprises an air flow chamber, a shroud connected to the air flow chamber and a propeller mounted in the shroud for generating air flow. The propeller comprises a front hub plate facing the processing chamber, the front hub plate having a central opening for receiving an axle and a plurality of radiating petals, a rear hub plate having a central opening for receiving the axle and a plurality of radiating petals, and a plurality of radiating blades, each blade attached at a first side edge to a radiating petal of the front hub plate and attached at a second side edge to a radiating petal of the rear hub plate.

According to still another aspect, a door for a bulk processor for processing items comprises a base member configured to couple to a processing chamber and having an opening and an axial fan mounted in the opening. The axial fan comprises a shroud protruding from an interior wall of the base member and housing a propeller, and an air flow chamber extending from the shroud for directing air flow generated by the propeller, a portion of the air flow chamber extending from an outside wall of the base member and a portion of the air flow chamber extending from an interior wall of the base member.

According to another aspect, a heater for heating air comprises a flame tube extending from a housing for combusting fuel to generate heat, an inner shroud surrounding a first end of the flame tube and having peripheral openings, an outer shroud surrounding the inner shroud and a series of baffle plates between an outlet of the inner shroud and an outlet of the outer shroud for mixing air heated by the flame tube.

In another aspect, a bulk processor with a processing chamber, conveyor and air circulator includes an exhaust for selectively exhausting air from the processing chamber, the exhaust having an inlet below the conveyor.

BRIEF DESCRIPTION OF THE DRAWINGS

These features and aspects of the invention, as well as its advantages, are described in more detail in the following description, appended claims, and accompanying drawings, in which:

DETAILED DESCRIPTION

Figure 1:
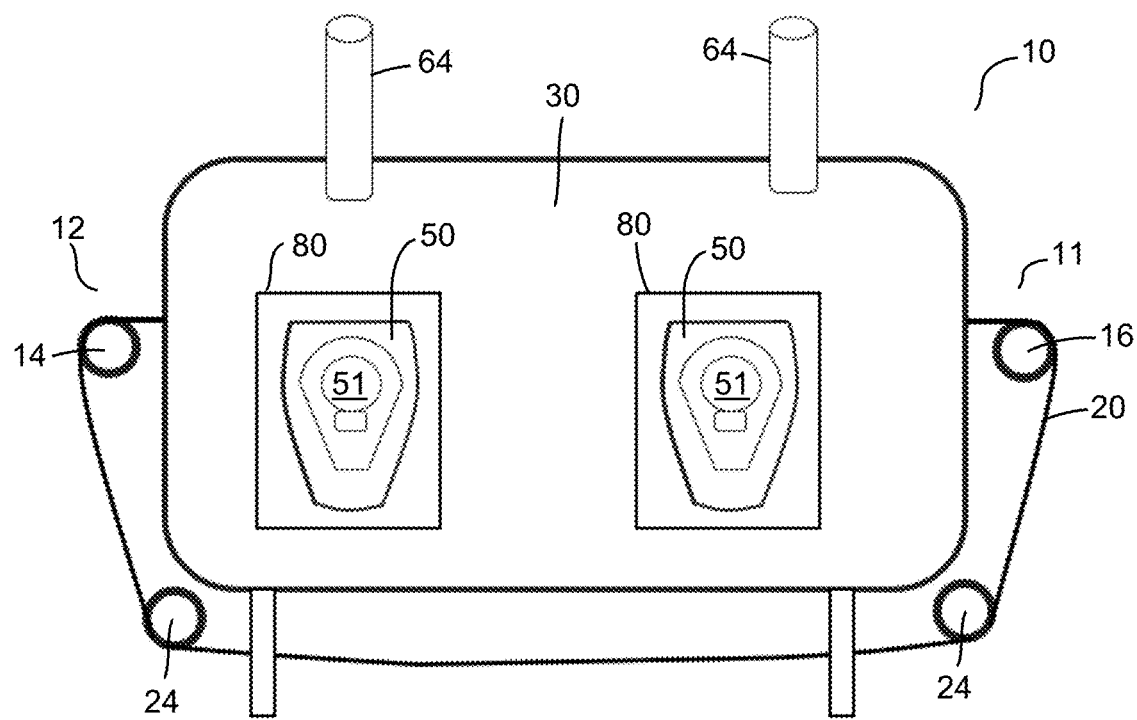
FIG. 1 is a side view of a bulk food processor according to an embodiment of the invention.
Figure 2:
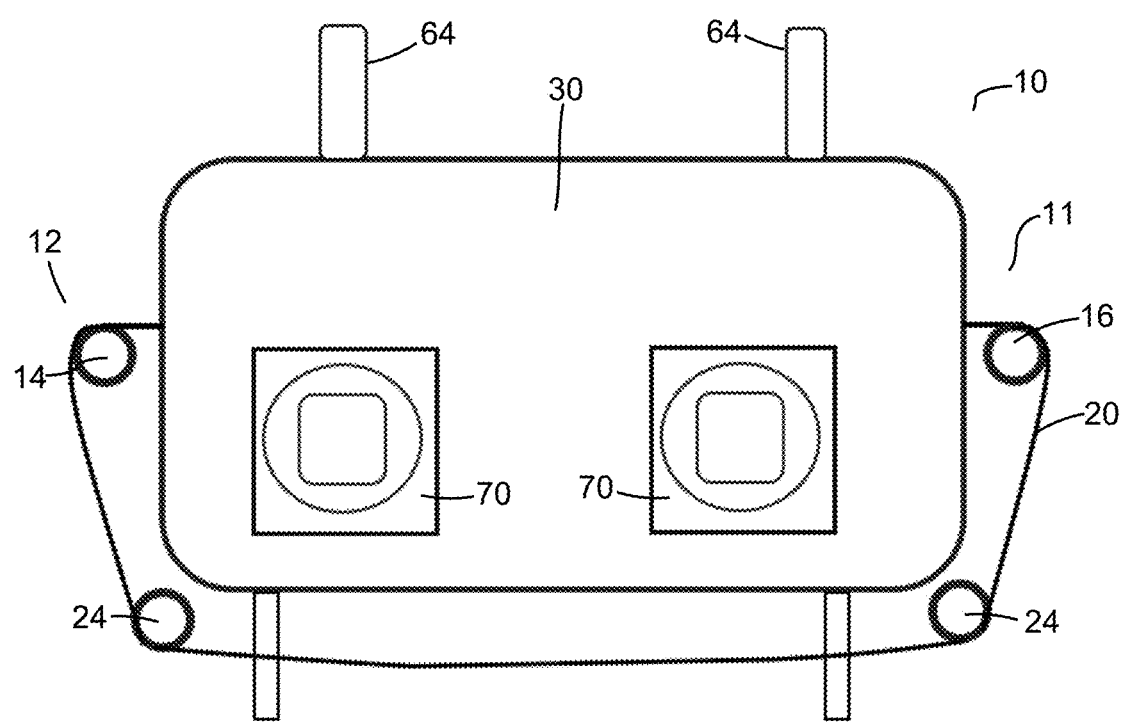
FIG. 2 is an opposite side view of the bulk food processor of FIG. 1.
Figure 3:
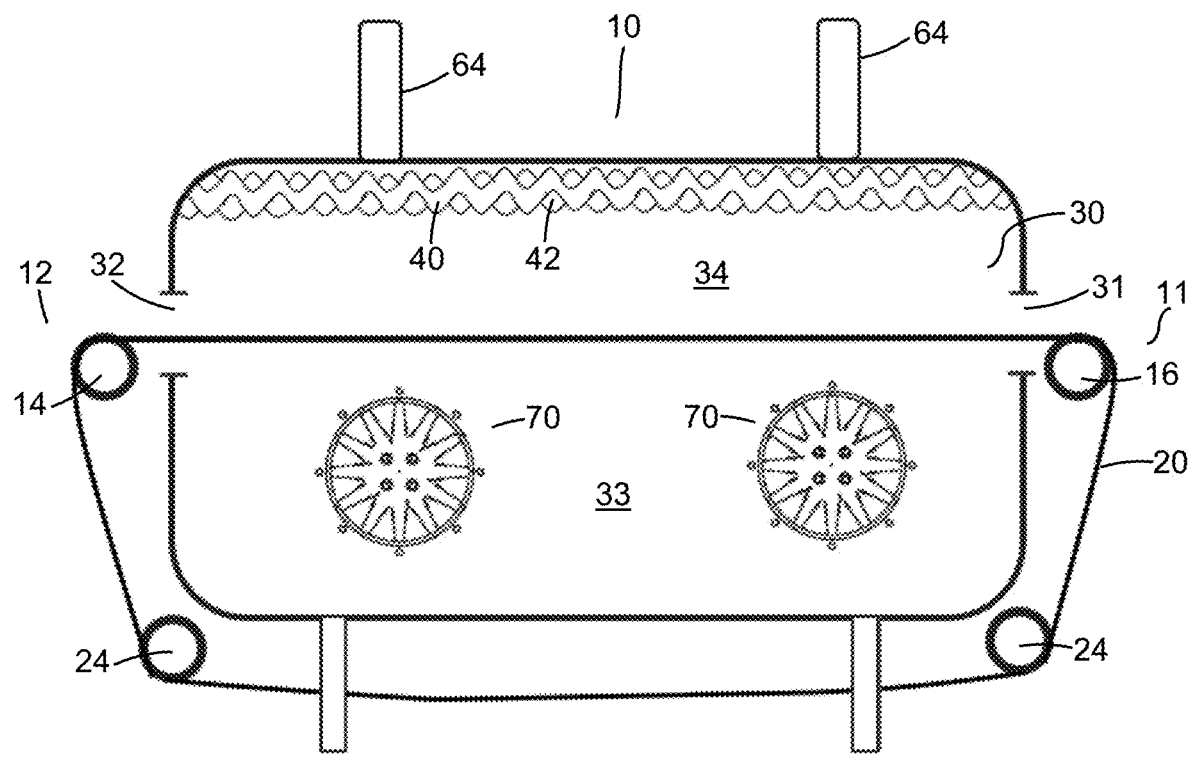
FIG. 3 is a cross-sectional side view of the bulk food processor of FIG. 1.
Figure 4:
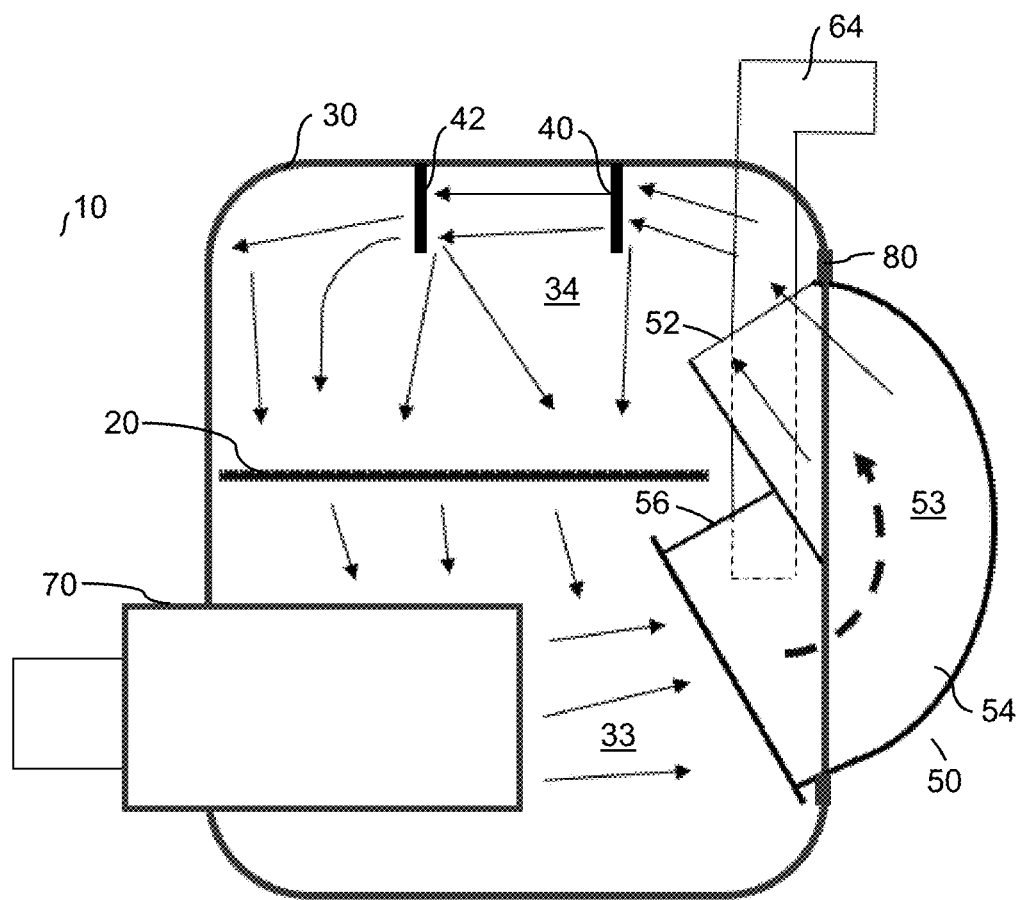
FIG. 4 is a cross-sectional front view of the bulk food processor of FIG. 1.
Figure 5:
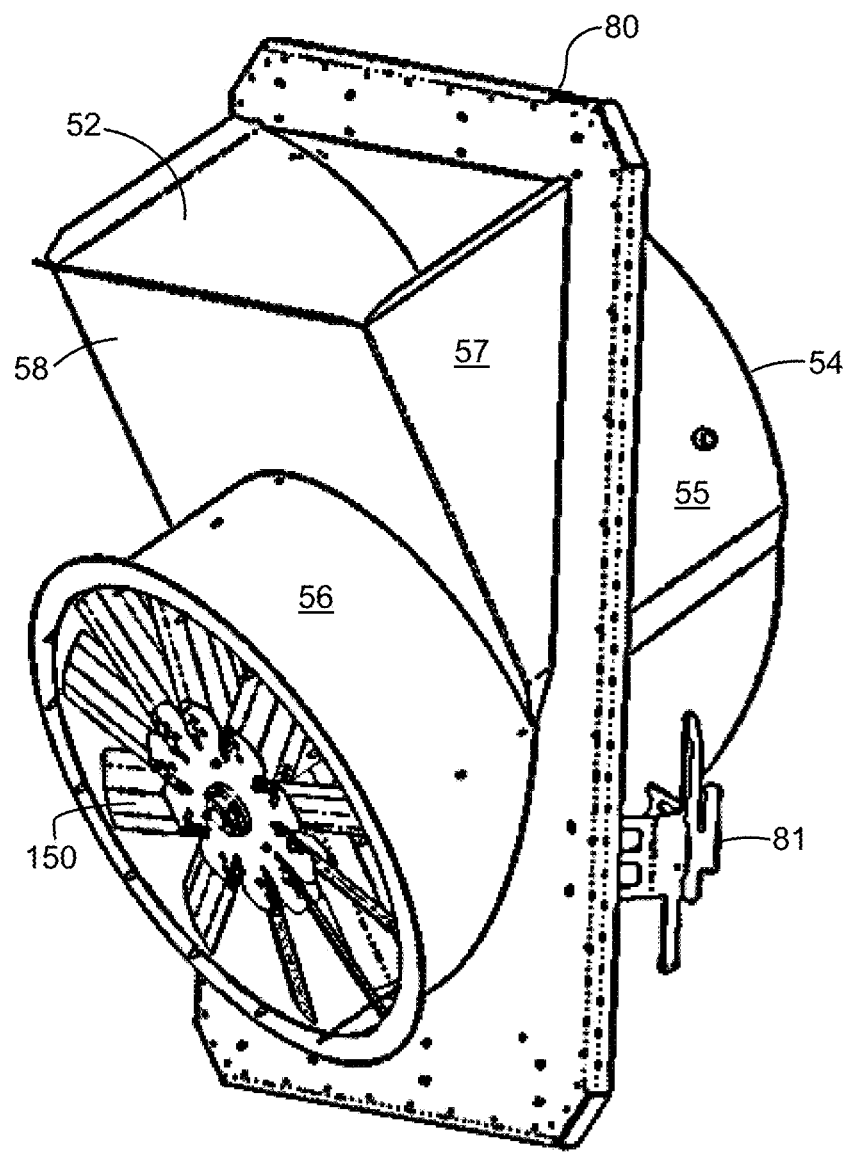
FIG. 5 is an isometric view of a door of the bulk food processor of FIG. 1 containing an angled axial fan.
Figure 6:
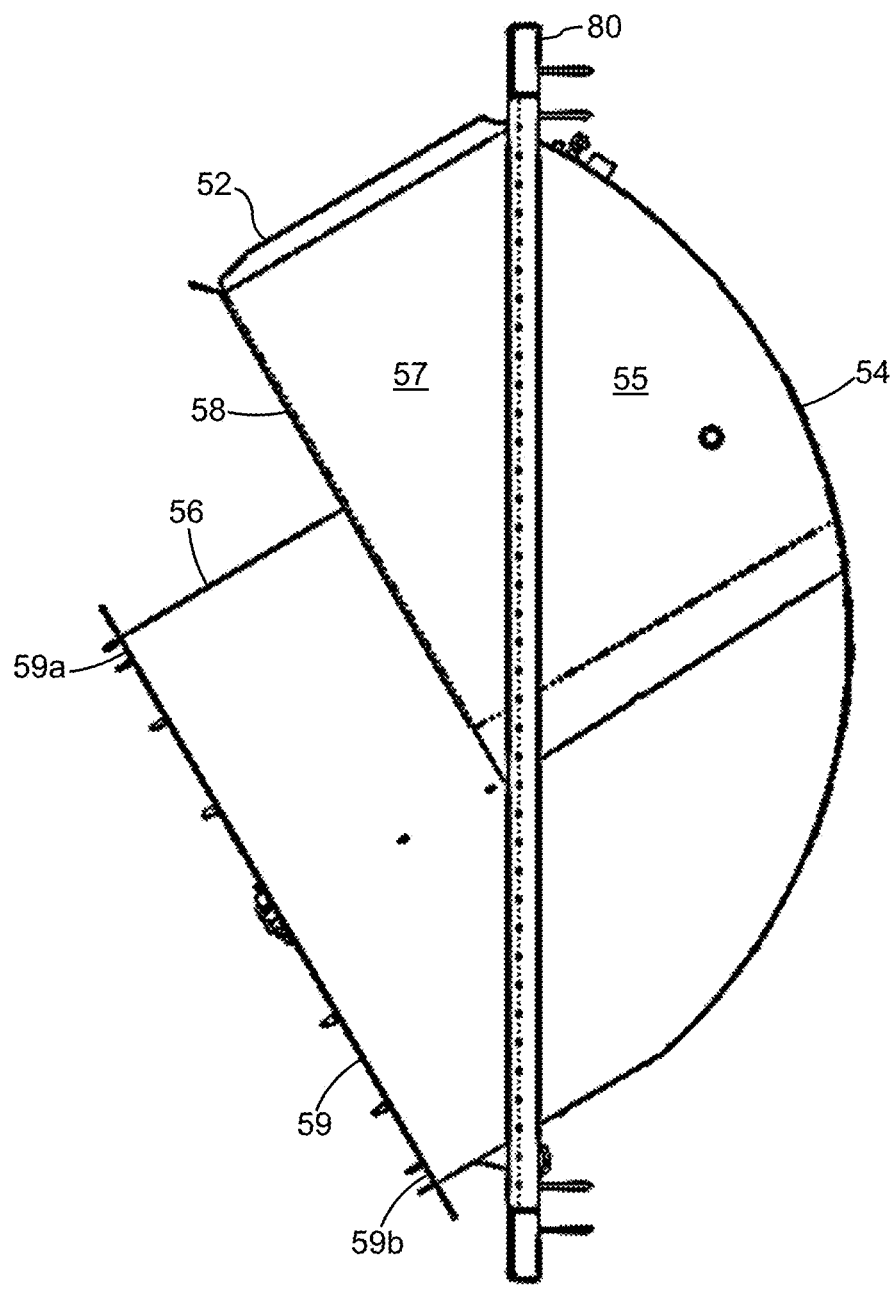
FIG. 6 is a side view of the door of FIG. 5.
Figure 7:
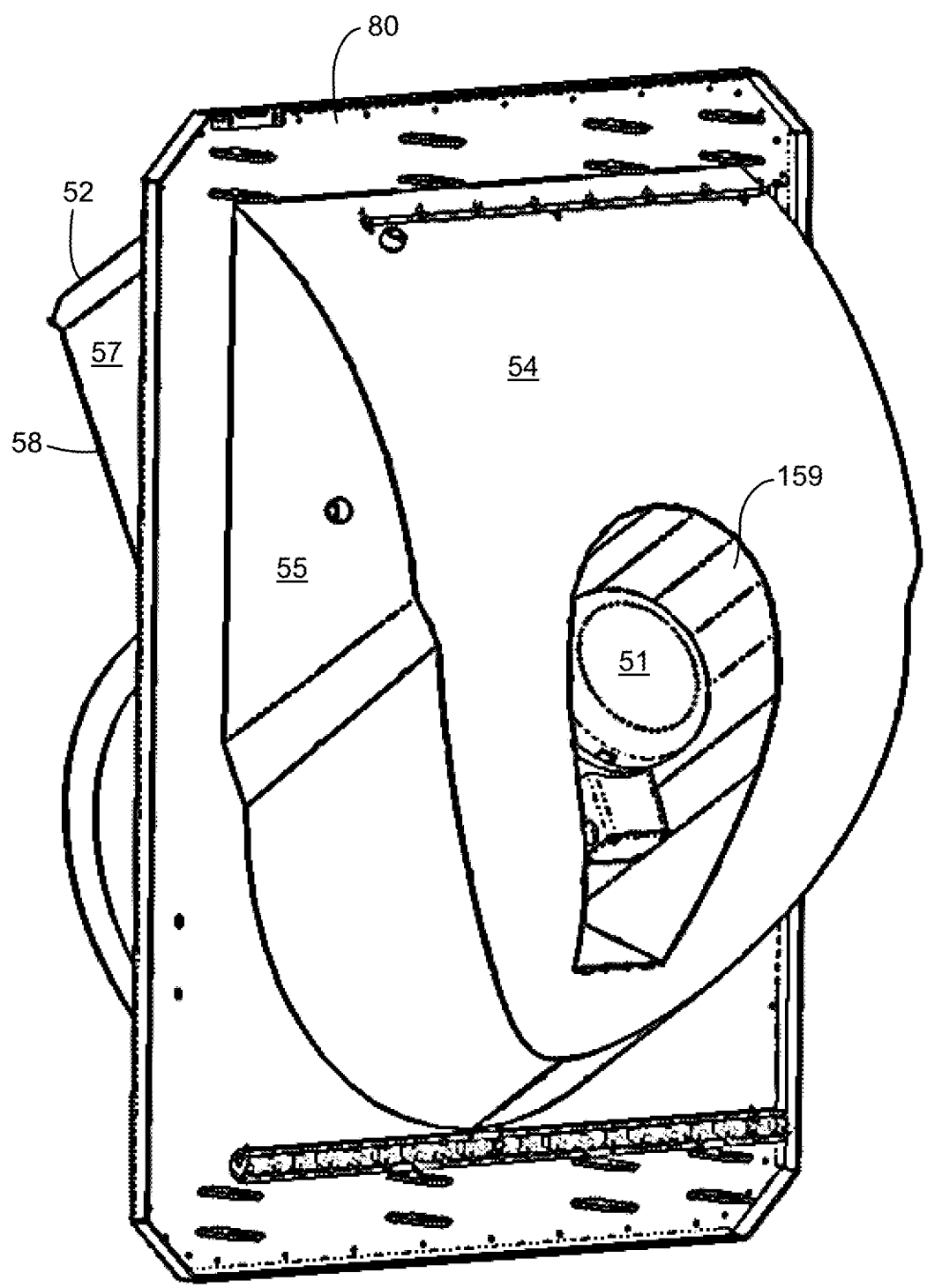
FIG. 7 is an isometric rear view of the door of FIG. 5.
Figure 8:
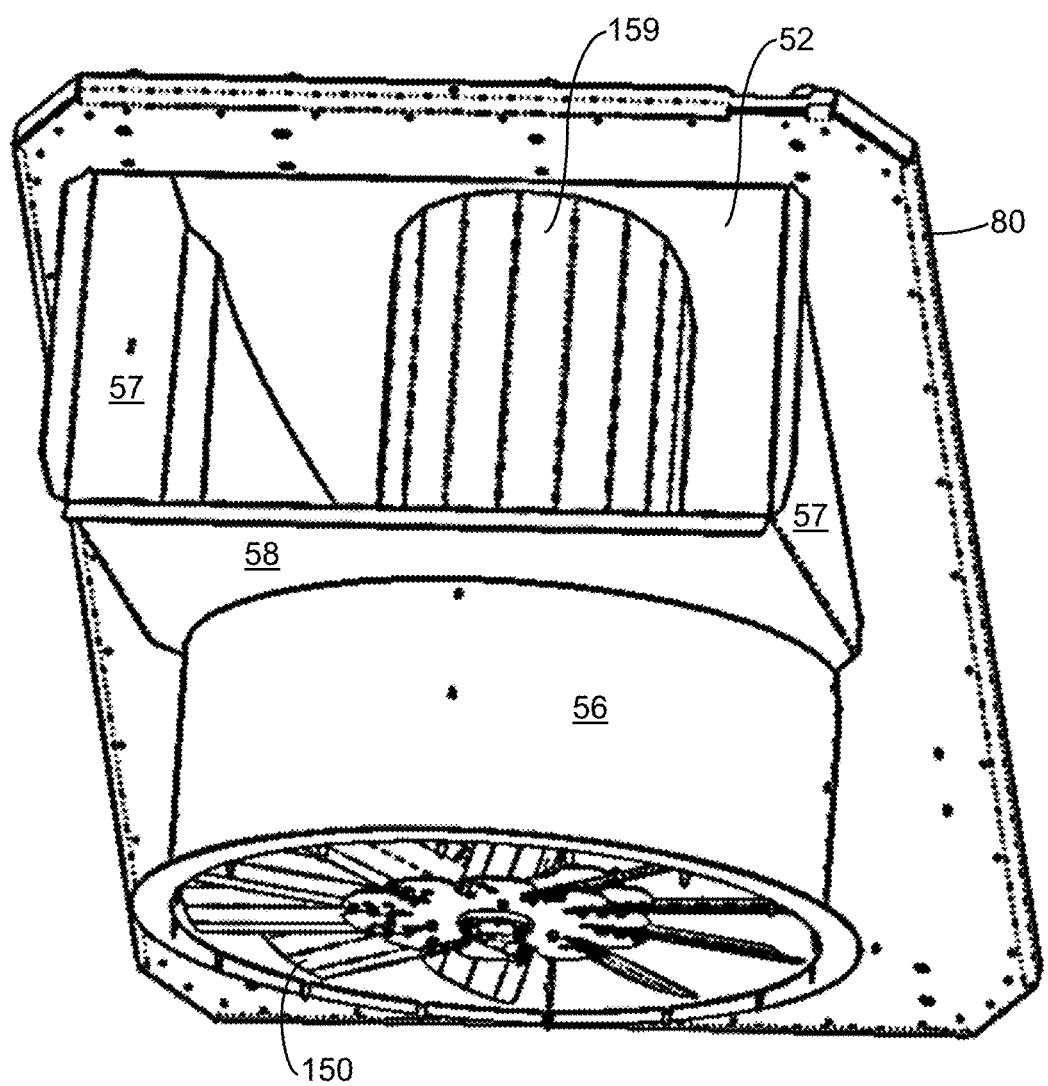
FIG. 8 is a top view of the door of FIG. 5.
Figure 9:
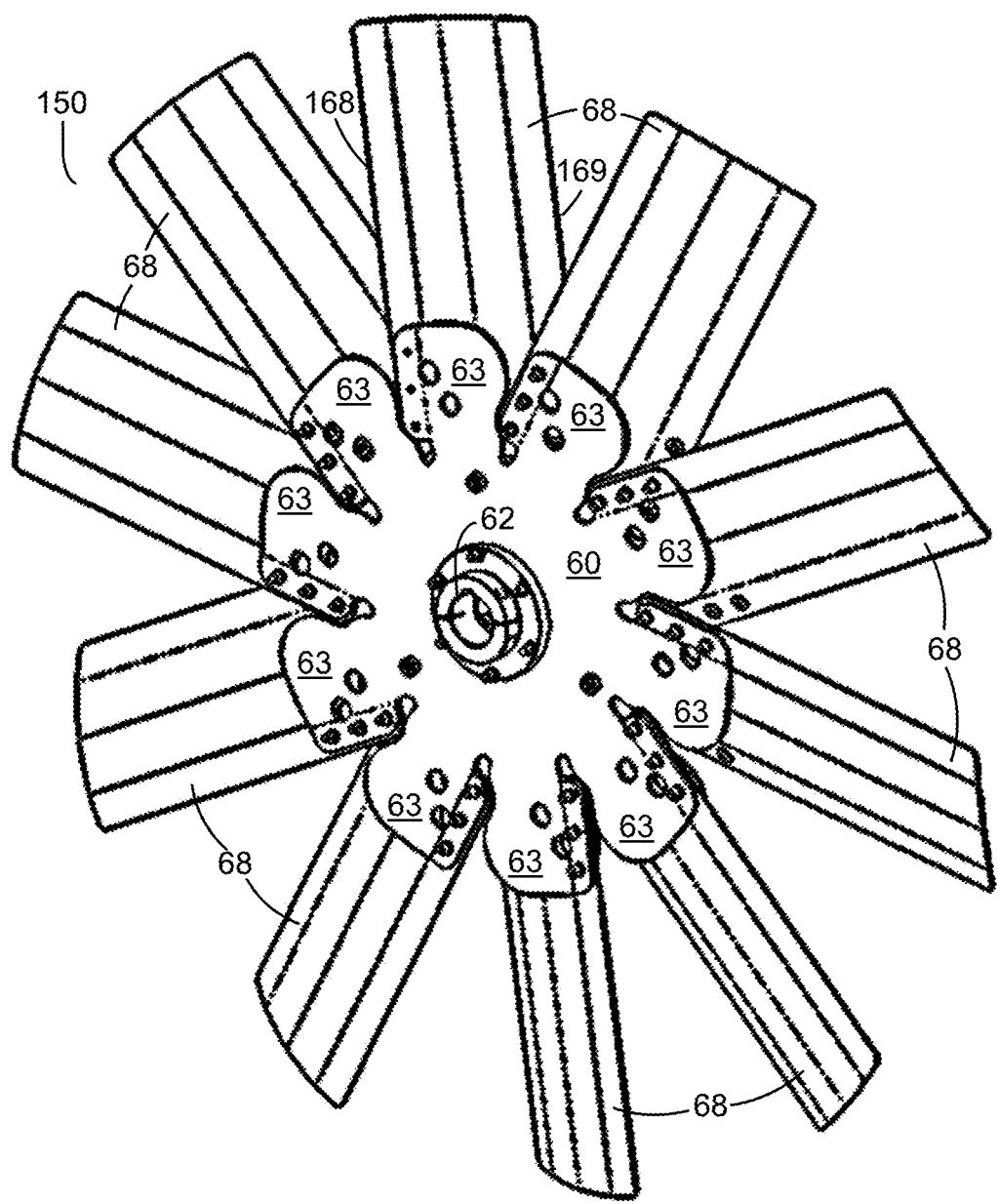
FIG. 9 is an isometric front view of the propeller portion of the axial fan of FIG. 5.
Figure 10:
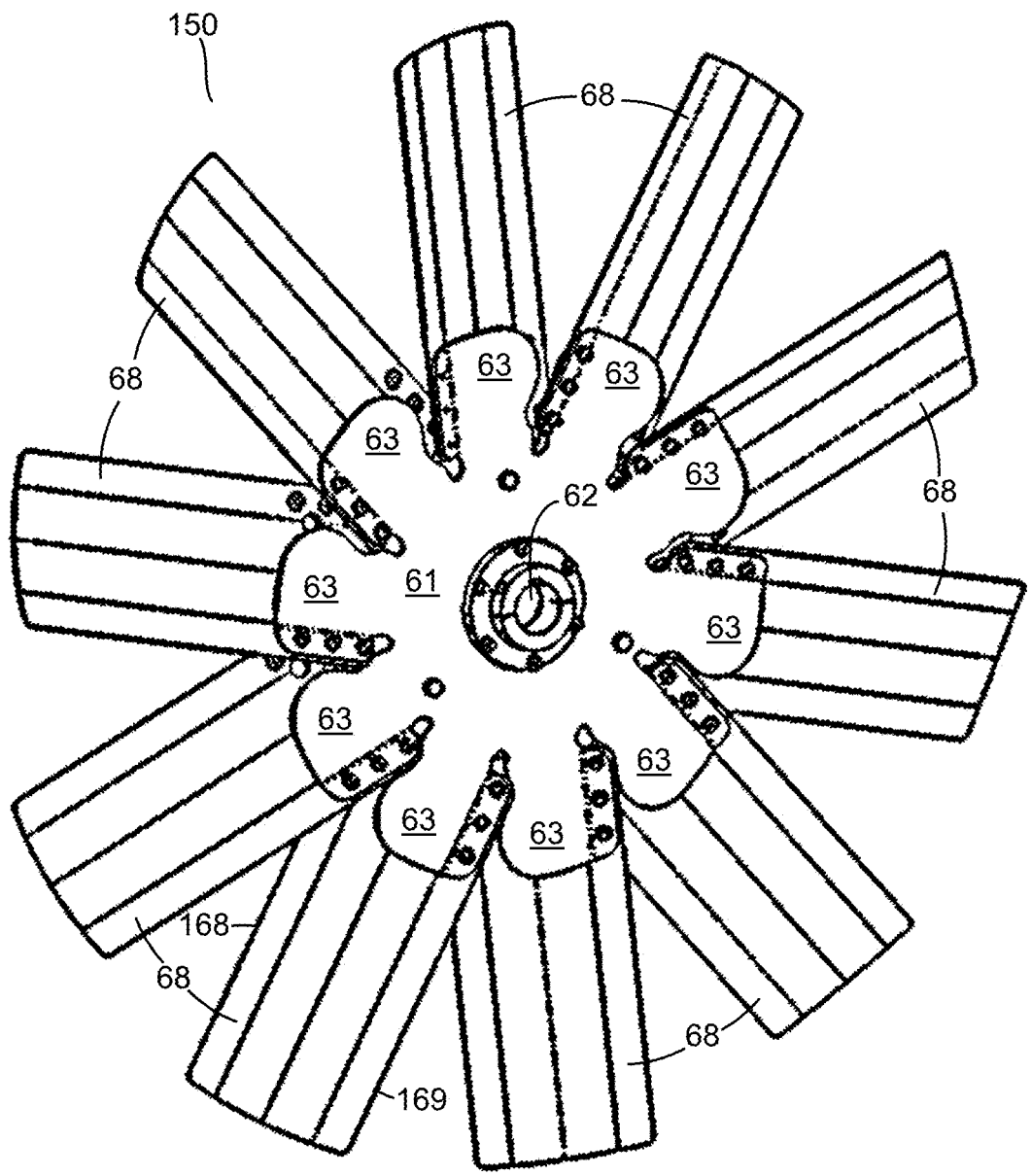
FIG. 10 is an isometric rear view of the propeller portion of FIG. 9.
Figure 11:
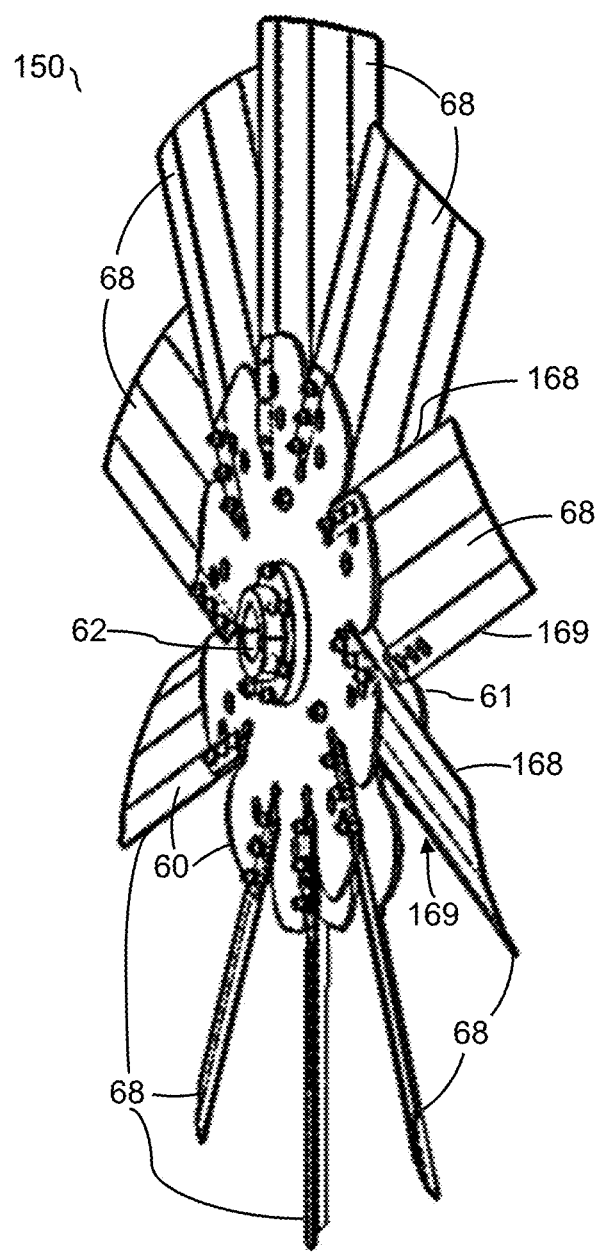
FIG. 11 is a side view of the propeller portion of FIG. 9.

A processor 10 that operates according to and embodies features of the invention is shown in FIGS. 1-4. The processor 10 changes the temperature of an item conveyed through the processor. For example, the processor can be used to raise the temperature of nuts being pasteurized, pasteurize nuts using steam, dry pasteurized nuts, cool pasteurized nuts or perform any suitable process on any suitable article, not limited to nuts.

The illustrative processor 10 comprises a chamber 30 with an entrance 31 for items to be processed at one end and an exit 32 for the processed items at an opposite end. A conveyor belt 20 receives items at the infeed 11 of the conveyor belt and conveys the items along a processing path, where a process, such as heating, cooling or steam pasteurizing, is performed on the items. The processed product exits the chamber at exit 32 and the conveyor belt reverses at outfeed 12 to return to the infeed via a returnway path. In one embodiment, the belt is a foraminous belt with sufficient opening to allow airflow therethrough. The conveyor belt 20 is trained around drive 14 and idle sprockets 16 at opposite ends of an upper carryway that traverses the processor, and driven by a motor or other suitable drive. Diverting rollers or drums 24 or other guides guide the endless conveyor belt 20 along a returnway below the carryway. The illustrative returnway is outside of and below the chamber 30, but the invention is not so limited. The conveyor belt may include repositioning flips formed by repositioning rollers (not shown) along the upper carryway, as described in U.S. Pat. Nos. 8,028,618 and 5,410,951, the contents of which are herein incorporated by reference. The invention is not limited to the illustrative conveyor belt and any suitable means can be used to convey articles through the processor, even conveyors without endless conveyor belts.

The processing chamber 30 includes a plurality of air circulators, shown as axial flow fans 50, for circulating air along an air flow path that intersects items being conveyed atop the conveyor belt 20 along the carryway. The illustrative conveyor belt 20 is foraminous to allow the air to pass through. Other features of such a processor as described thus far are given in U.S. Pat. No. 6,274,188, "Method for Steam-Cooking Shrimp at Reduced Temperatures to Decrease Yield Loss," Aug. 14, 2001, and PCT Published Application Number WO 2015/133981, entitled "Low-Temperature, Forced-Convection, Steam-Heating of Nuts", and U.S. Provisional Patent Application No. 62/365,086 entitled "Bulk Food Processor with Angled Fan", all of which are incorporated herein by reference. One example of such a cooker is the CoolSteam® cooker manufactured and sold by Laitram Machinery, Inc., of Harahan, Louisiana, U.S.A.

The axial flow fan 50, driven by a motor 51, pulls air from a lower region 33 below the conveyor belt 20, and pushes air up into an air flow chamber 53 on the side of the processing chamber 30. As used herein, an axial flow fan, or an axial fan, as opposed to a radial or centrifugal fan, refers to an air circulator that causes air to move in a direction parallel to the shaft about which the fan blades rotate. However, the processor is not limited to an axial fan, and any suitable air circulator, including, but not limited to, radial or centrifugal fans, may be used to circulate air or another fluid through the illustrative processing chamber 30.

The illustrative air flow chamber 53 extends up the side of the processing chamber 30, forming a portion of the side wall of the processing chamber 30. The illustrative axial flow chamber 53 includes portions within the processing chamber 30 and portions that extend beyond the side wall of the processing chamber.

The top of the processing chamber 30 can shaped to direct the airflow over the product on the conveyor belt 20. The region 34 above the conveyor belt forms a high pressure region, while the region below the conveyor belt 20 forms a lower pressure region 33. Air is pushed through the foraminous conveyor belt 20 into the low-pressure region 33 below the conveyor belt and continues to circulate to process conveyed product. The processing chamber 30 also includes an exhaust 64 for releasing air to the ambient, if necessary.

In one embodiment, the exhaust 64 pulls air from the bottom chamber 33, i.e., the low-pressure region of the chamber 30. The illustrative inlet to the exhaust pipe is below the conveyor belt, so that lower-pressure air is exhausted. The exhaust 64 can be a powered exhaust that pulls air from the low-pressure chamber and releases it to the environment using a fan or other suitable device, though the invention is not so limited.

The air circulated by the axial flow fan 50 may be heated, cooled, or at ambient temperature. In the illustrative embodiment, the processing chamber 30 includes heaters 70 for heating the circulated air, the details of which are described below.

The upper, high pressure chamber 34 above the conveyor belt includes baffles 40, 42 for mixing the circulated air and directing an even flow of air over the conveyor belt 20. In one embodiment, the baffles 40, 42 comprise offset sheets of metal connected to and hanging from the top of the chamber 30 and extending in a longitudinal direction above the conveyor. Each baffle 40, 42 has a wavy shape, with the crests of a first baffle 40 offset from the crests of a second baffle 42. In this manner, some of the air blown by the fan 50 is deflected by the first baffle and over the product, some of the air passing through the baffle 40 is deflected down by the second baffle 42 and the remaining air passing through the second baffle 40 is deflected down over the product by the side wall of the chamber 30. While the illustrative baffles 40, 42 have a sinusoidal shape, the invention is not so limited. For example, the baffles 40, 42 could be perforated sheet metal with offset openings, a number of smaller sheets arranged and spaced apart to direct air flow or have any other suitable configuration for providing an evenly mixed flow of air over a product. The baffles 40, 42 may have any suitable location, size and shape and be mounted to any suitable component in the chamber 34.

The illustrative axial flow fan 50, shown in detail in FIGS. 5 through 8, may be mounted in a door 80 of the processing chamber 30 to facilitate access to the axial flow fan 50 for cleaning, replacement, repair, testing or any other reason. The illustrative axial flow fan is mounted obliquely in the door 80, with the fan motor 51 extending obliquely through the door 80 and into the lower portion of the processing chamber. The axial flow fan 50 and motor 51 may be mounted at any suitable angle to facilitate airflow through the air flow chamber 53 extending from the fan inlet 59 below the conveyor belt 20 to the fan outlet 52 above the conveyor belt. The illustrative door 80, comprising a planar base member designed to fit in an opening in the processing chamber and having an opening for mounting the axial flow fan 50, may be hingedly or otherwise movably connected to the side wall of the chamber 30 and a latch 81 may be used to latch the door in a closed position during operation. The door may have any suitable size, shape, configuration and location, and is not limited to the illustrative embodiment.

In one embodiment, the axial flow fan 50 and motor 51 are tilted inward at an angle between about 15° and about 45° and preferably about 30°, though the invention is not so limited. The axial flow fan 50 has a shroud 56 that extends to and interfaces with the lower portion 33 of the processing chamber 30 at an angle, so that the bottom of the fan inlet 59b is closer to the door 80 than the top of the fan inlet 59a. The propeller portion 150 of the axial flow fan 50 is mounted at the inlet to the shroud 56 at the oblique angle.

The air flow chamber 53 includes a curved back wall 54 to facilitate air flow. The curved back wall 54 extends beyond the outside wall of the planar member defining the base of the door 80. The illustrative back wall 54 curves about 180° from the bottom of the door 80 to the top of the door. On the inside of the door 80, the top portion of the axial flow chamber 53 extends up and inward at an angle and includes a rectangular outlet 52 pointing into the high pressure region 34 at an angle. The outlet 52 may include flow straighteners. The interior portion of the air flow chamber 53 includes triangular side walls 57 extending from an interior wall of the door planar member and an angled front wall 58 having a lower curved edge intersecting the shroud 56 and an upper edge forming a wall of the outlet 52.

The portion of the air flow chamber that extends outside of the door 80 is formed by the curved back wall 54 and shaped side walls 55 connecting the curved back wall to the door. A cut out in the air flow chamber 53 is formed by shaped walls 159 and accommodates the axial fan motor 51. The illustrative cut out has the shape of an upside down, truncated tear drop, but the invention is not so limited. The resulting air flow chamber 53 produces enhanced, well-mixed, even air flow into the upper portion of the processing chamber 34.

FIGS. 9-12 show an embodiment of a propeller portion of the axial fan 50. The illustrative propeller portion 150 of the axial fan 50 comprises a front hub plate 60 facing the lower chamber 33, a rear hub plate 61 facing the air flow chamber 53 and a plurality of blades 68 mounted to and extending between front and rear hub plates 60 and 61.

Figure 12:
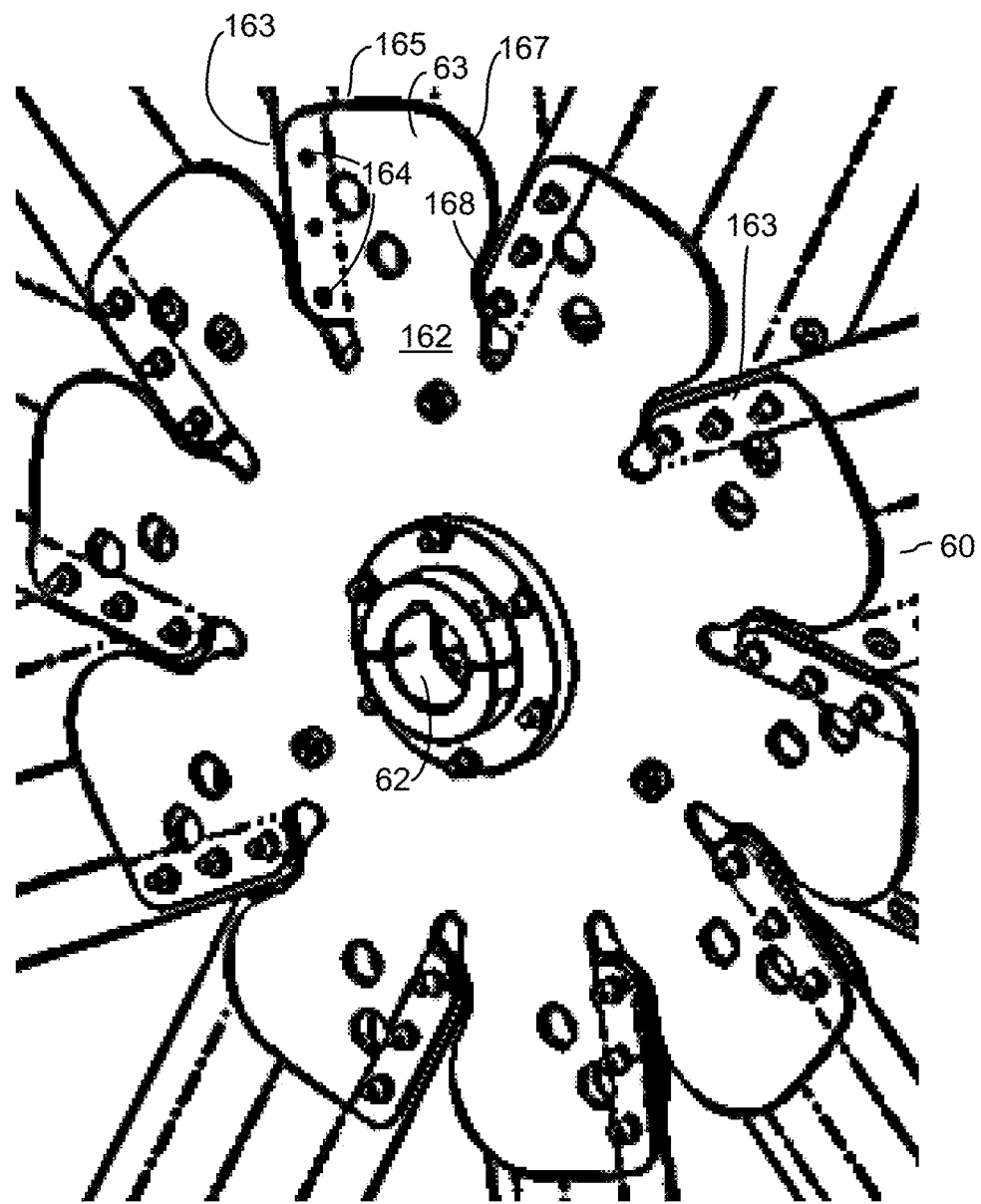
FIG. 12 is a detailed view of the front hub plate of the propeller portion of FIG. 9.

Each hub plate 60, 61 comprises a central opening 62 for receiving and clamping onto an axle from the motor 51. A plurality of petals 63 extend radially and are distributed about the periphery of each hub plate. As shown in FIG. 12, each petal 63 comprises a narrow neck 162 and a wider body defined by a flat side edge 163 including a plurality of openings 164 for receiving fasteners, such as rivets, to fasten a blade 68 to the hub plate. A radially outer flat edge 165 transitions to a curved side edge 167. The curved side edge 167 includes an inner indent 168 for accommodating a radially inner corner of an adjacent petal flat side edge.

Each blade 68 comprises a bent rectangular sheet having a flat first side edge 168 with a radially inner portion fastened to the flat side edge 163 of a petal 63 of the front hub plate 60 using fasteners, such as rivets. A second flat side edge 169 of the blade 68 is fastened to the rear hub plate 61 so that the blade extends at an angle between the two hub plates. The front and rear hub plates 60, 61 are arranged relative to each other, so that a first side edge 168 of a first blade 68 can be mounted to a flat side edge 163 of a petal on the front hub plate 60, while the second side edge 169 of the blade 68 is mounted to a flat side edge 163 of a petal 63 on the rear hub plate 61. The propeller portion of the axial fan 50 is not limited to the propeller 150 shown in FIGS. 9-12 and any suitable fan, including a non-axial fan, may be used to circulate air in the processor 10.

Figure 13:
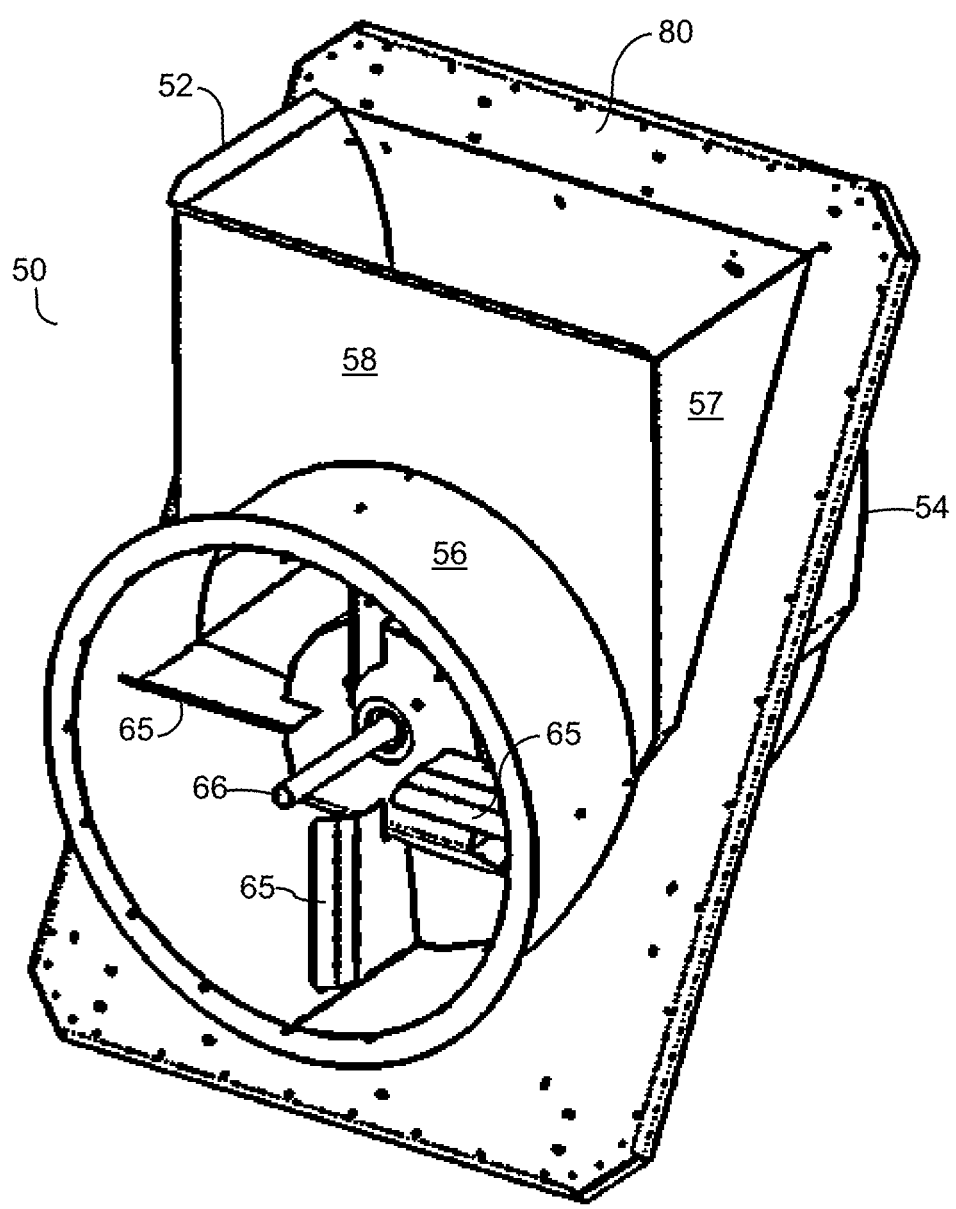
FIG. 13 is an isometric front view of the door of the bulk food processor with the propeller portion of the axial fan removed.
Figure 14:
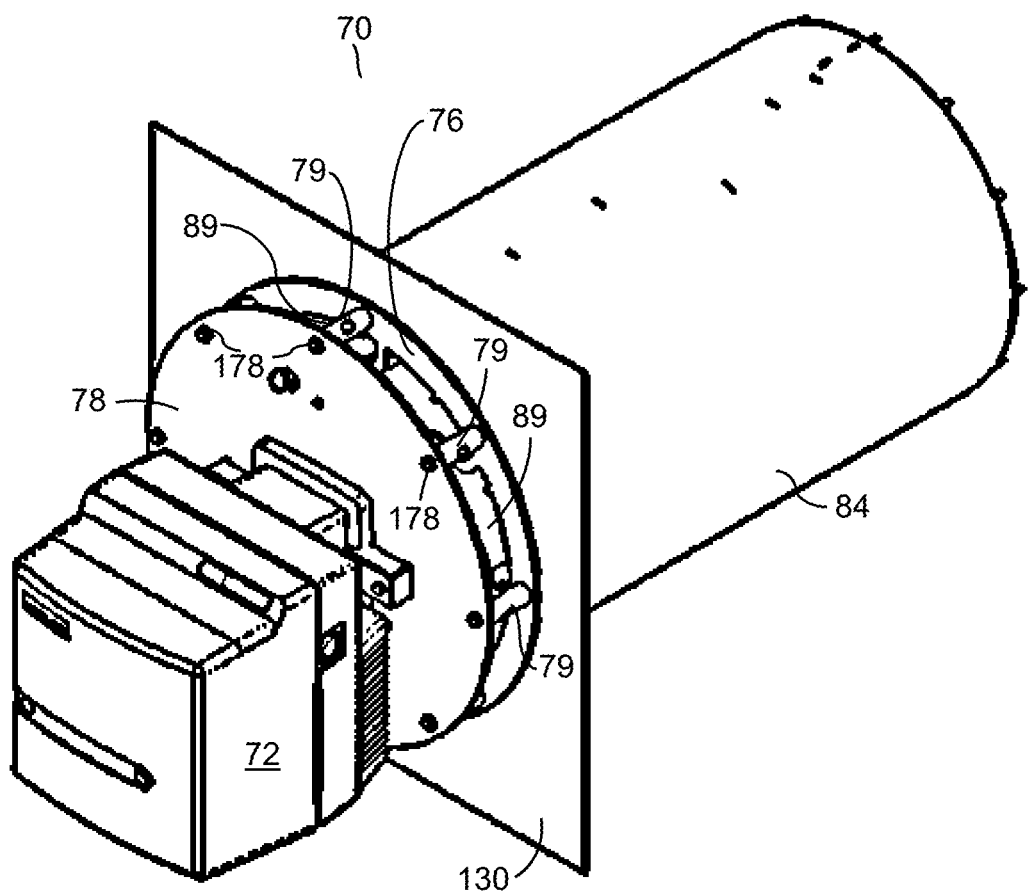
FIG. 14 is an isometric exterior view of the heater of the bulk food processor of FIG. 2.
Figure 15:
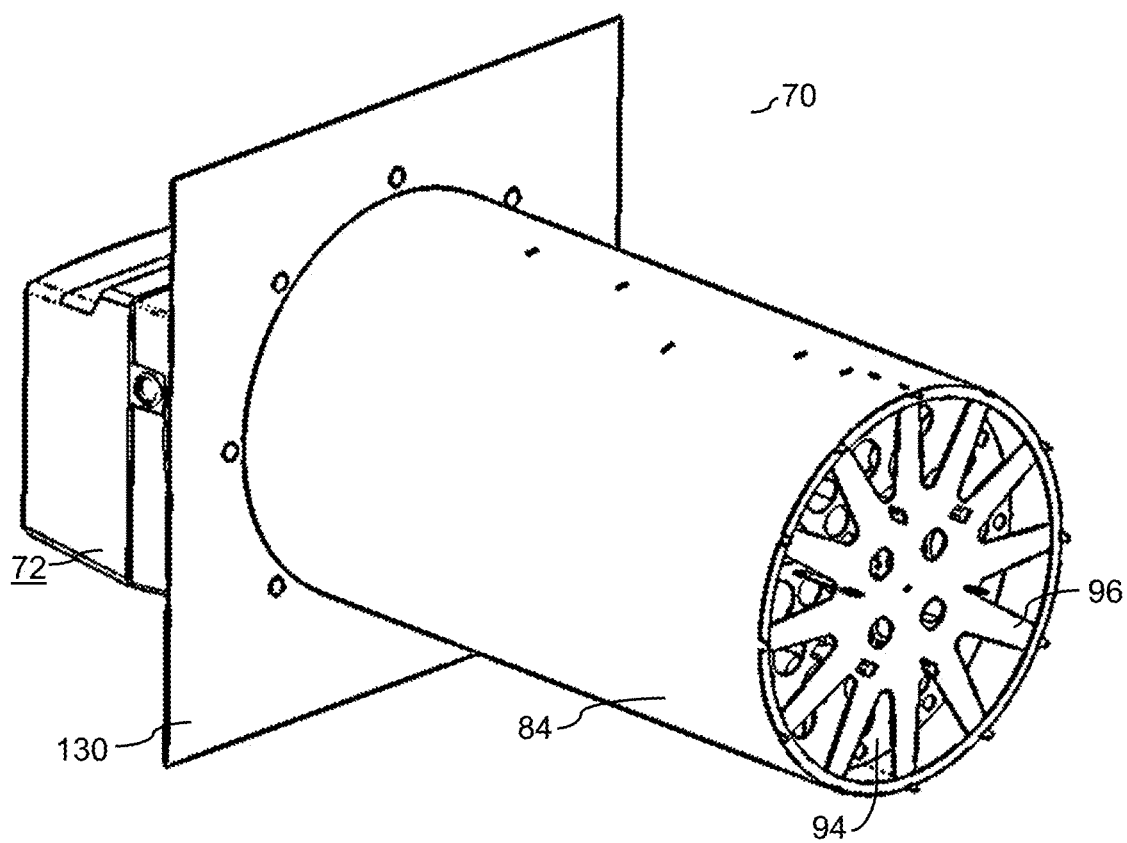
FIG. 15 is an isometric interior view of the heater of FIG. 14.
Figure 16:
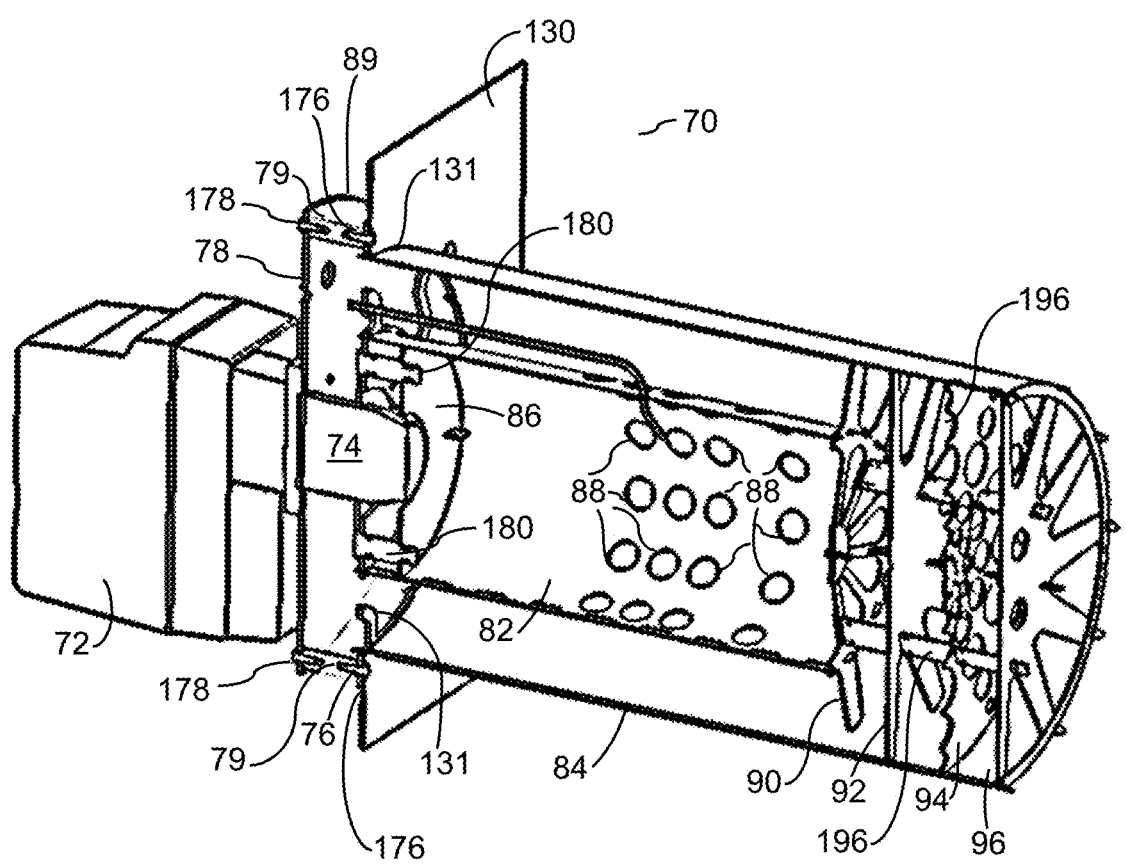
FIG. 16 is a cross-sectional view of the heater of FIG. 14.
Figure 17:
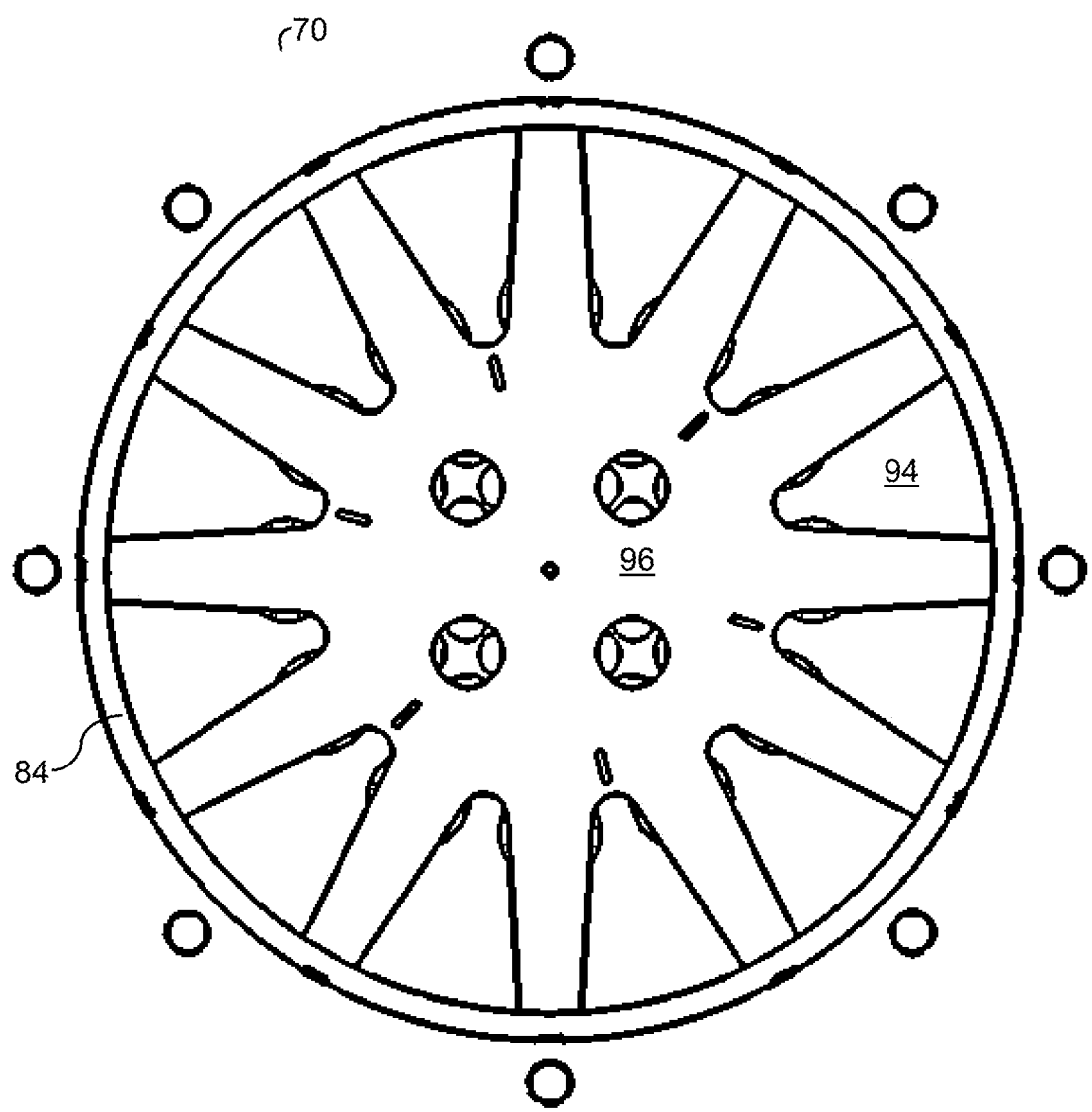
FIG. 17 is a front view of the heater of FIG. 14.

The axial fan 50 can also include flow straighteners 65, as shown in FIG. 13. The illustrative flow straighteners 65 are formed of bent sheet metal, but the invention is not so limited. FIG. 13 also shows the axle 66 extending from the motor through the shroud 56 for driving the propeller 150.

As described above, the illustrative processor 10 includes a heater 70 for heating the circulated air to process a product. FIGS. 14-17 show an embodiment of a suitable heater 70 for heating circulated air, though the invention is not limited to the illustrative heater 70. The illustrative heater 70 comprises a natural gas burner with flow distributers mounted in the side wall 130 of the chamber 30 opposite the axial fan inlet 59, below the conveyor belt. The heater 70 includes a housing 72 mounted outside the chamber 30 that houses motors, valves, fuel supply and other components required to combust a fuel to generate heat. A flame tube 74, where combustion occurs, extends from the housing 72, through the side wall 130 of the processing chamber 30 and into the interior of the lower portion 33 of the chamber 30. Alternatively, the heater can be mounted in a different location, and is not limited to a location below the conveyor 20.

The heater 70 further includes an inner shroud 82 for the flame tube 74. An outer shroud 84 surrounds the inner shroud 82, and is longer than the inner shroud, so that the exit of the outer shroud extends farther into the chamber 30. The shrouds may increase the pressure in the combustion region of the heater to facilitate combustion. The inner shroud 82 is a cylindrical tube forming an inner heat chamber. The inner shroud 82 extends inwards from the side wall 130 and has a plurality of peripheral openings 88 for directing heat into the space between the inner shroud and the outer shroud 84. A heat barrier plate 86 surrounds the flame tube and blocks heat from passing back towards the side wall 130. A series of baffle plates 90, 92, 94, 96 are arranged between the interior facing end of the inner shroud 82 and the interior facing end of the outer shroud 84. The baffle plates include openings to fully mix heated air from the flame tube 74. Spacing pins 196 connect the baffle plates 90, 92, 94, 96 together, as described below.

Figure 18:
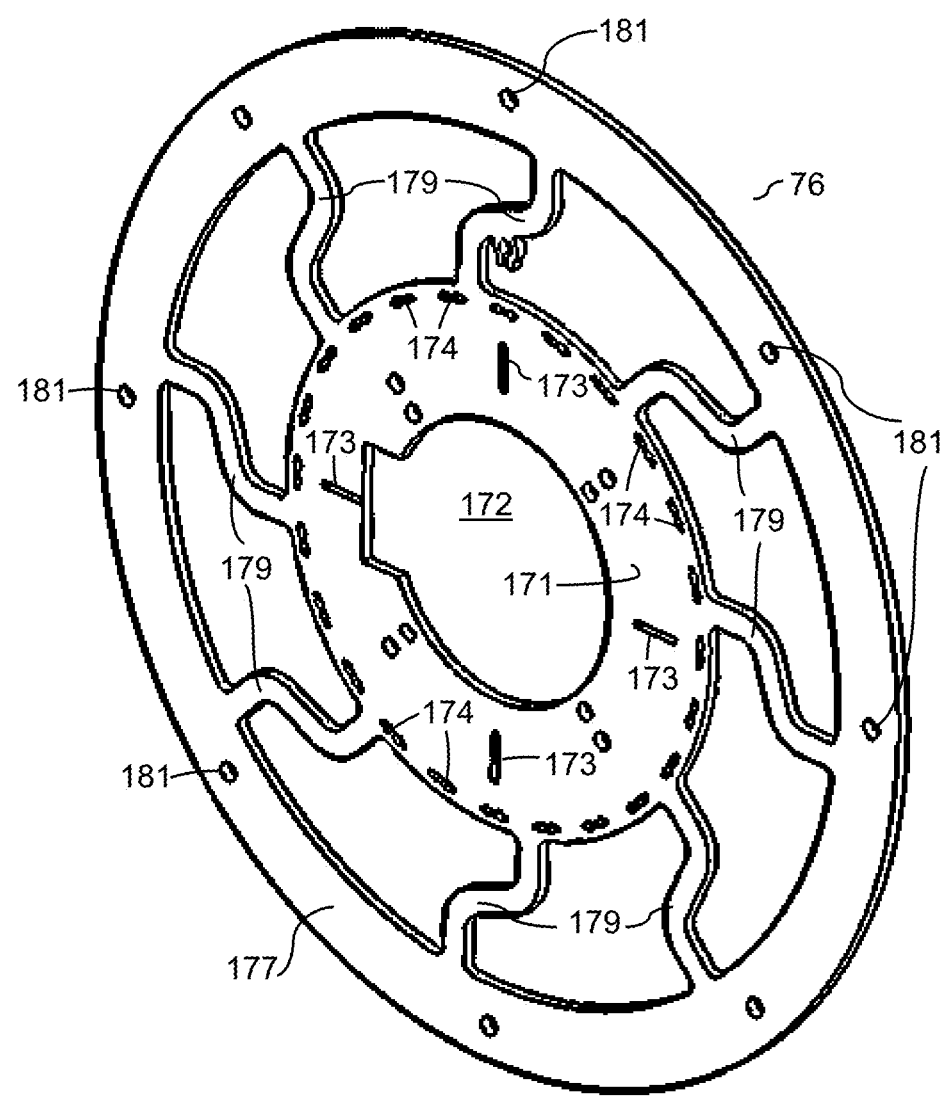
FIG. 18 is an isometric view of the air flow plate of the heater of FIG. 14.

The processing chamber side wall 130 includes an opening 131 sized and configured to mount the outer shroud 84. An air flow plate 76 surrounds the opening 131 on the exterior of the wall 130 and is mounted to the wall 130 using fasteners 176. An embodiment of the air flow plate 76 is shown in FIG. 18. An outer mounting plate 78 receives the heater housing 72 and connects the heater housing 72 to the air flow plate 76. The outer mounting plate 78 is connected to spacers 79 via fasteners 178, and the spacers 79 connect to the air flow plate fasteners 176 to create openings 89 for air intake into the interior space within the outer shroud 84. Any suitable means for forming intake openings may be used, and the invention is not limited to the illustrative means. As described above, the processor includes an exhaust 64 to balance for the air pulled into the chamber via the heater 70.

In one embodiment, the housing 72 and components therein and flame tube 74 comprise a compact burner unit available from Max Weishaupt GmbH of Schwendi, Germany, a burner available from Honeywell Eclipse™ or another burner known in the art, though the invention is not so limited. The heater could comprise any heat source, including, but not limited to, an electric heat source, a natural gas heat source, a propane heat source, an oil heat source or other available heat source.

Referring to FIG. 18, the air flow plate 76 comprises a central hub 171 having a central opening 172 for receiving the flame tube 74. The central hub 171 includes peripheral slots 174 for receiving mounting tabs of the inner shroud 82. The central hub 171 further includes radial slots 173 for receiving spacing pins 180 (shown in FIG. 16) to connect and space the heat barrier plate 86 and the air flow plate 76. Flexible spokes 179 connect the central hub 171 to an outer rim 177, which includes openings 181 for receiving the fasteners 176 to mount the air flow plate 76 to the processing chamber side wall 130 and spacers 79. While the illustrative air flow plate 76, outer mounting plate 78 and heat barrier plate 68 are disc-shaped, the invention is not limited to the illustrative shape, and the shape can vary, depending in particular on the size and shape of the side wall opening 131.

Referring to FIGS. 19-22, the baffle plates 90, 92, 94, 96 promote air mixing while protecting the flame tube from contamination. The baffle plates 90, 92, 94, 96 overlap each other and are configured to prevent a straight path through the series of baffle plates. Each plate comprises a basic disc shape with openings to allow air flow. The openings of each baffle plate preferably align with a solid portion of another baffle plate, so that heated air passing through an opening is redirected by a subsequent baffle plate.

Figure 19:
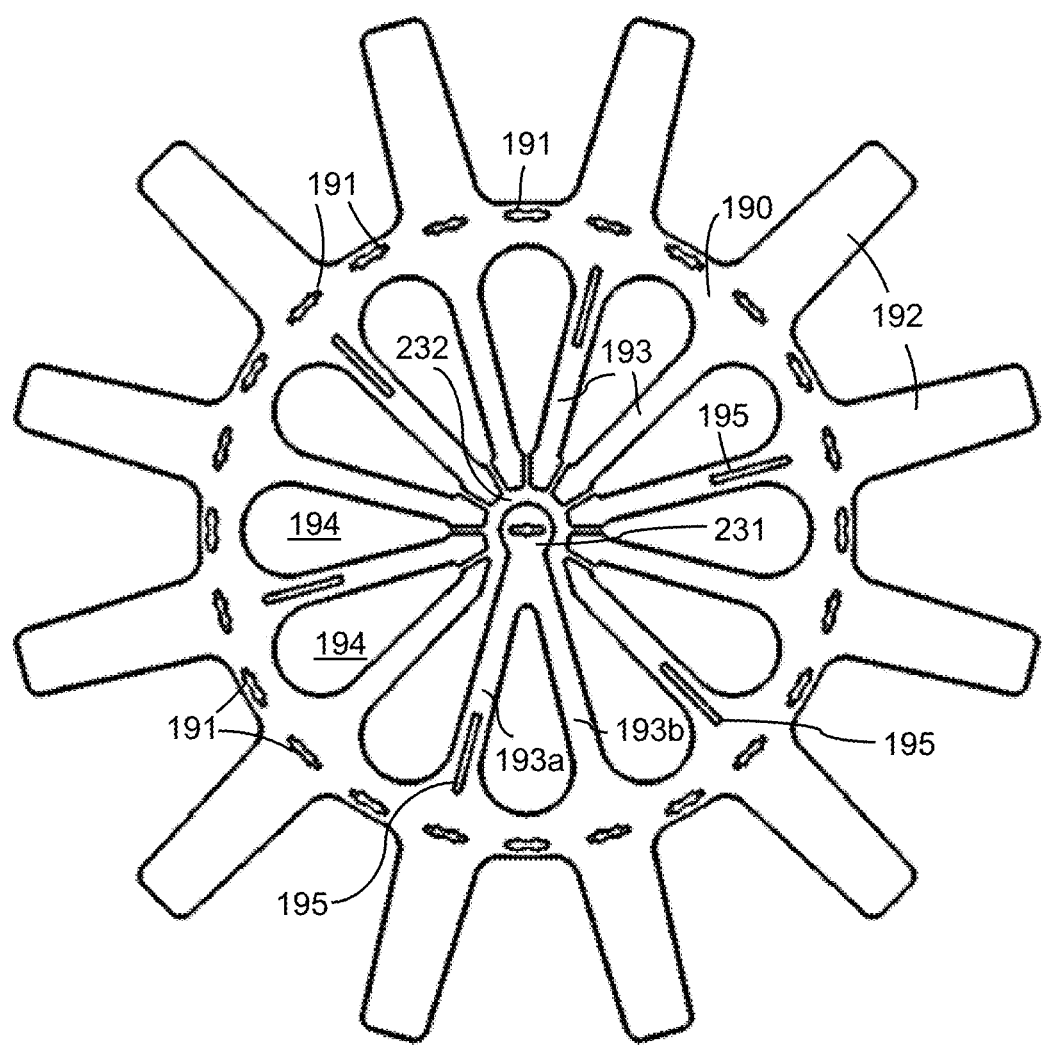
FIG. 19 is a front view of the first baffle plate of the heater of FIG. 14.

A first baffle plate 90, shown in FIG. 19, has an inner rim 190 with peripheral slots 191 for receiving mounting tabs on the inner shroud 82 to mount the first baffle plate 90 to the inner shroud. Outer spokes 192 radiate from the inner rim 190 to the inner surface of the outer shroud 84 to provide baffling between the inner shroud and outer shroud. Inner spokes 193 extend between the inner rim 190 and center disc 231, forming openings 194 for airflow. Two of the inner spokes 193a, 193b connect to the center disc 231, with an arc-shaped space 232 formed between the inner tips of the other inner spokes 193. In one embodiment, the remaining inner spokes 193 are not connected near the center to allow the material to expand when exposed to the high temperature from the flame tube 74, but the invention is not so limited. The illustrative center disc portion 231 includes an opening holding two thin discs to reduce vibration caused by air flow. Radial slots 195 are provided in certain spokes to receive mounting and spacing pins 196 to connect the baffle plates 90, 92, 94, 96 together.

Figure 20:
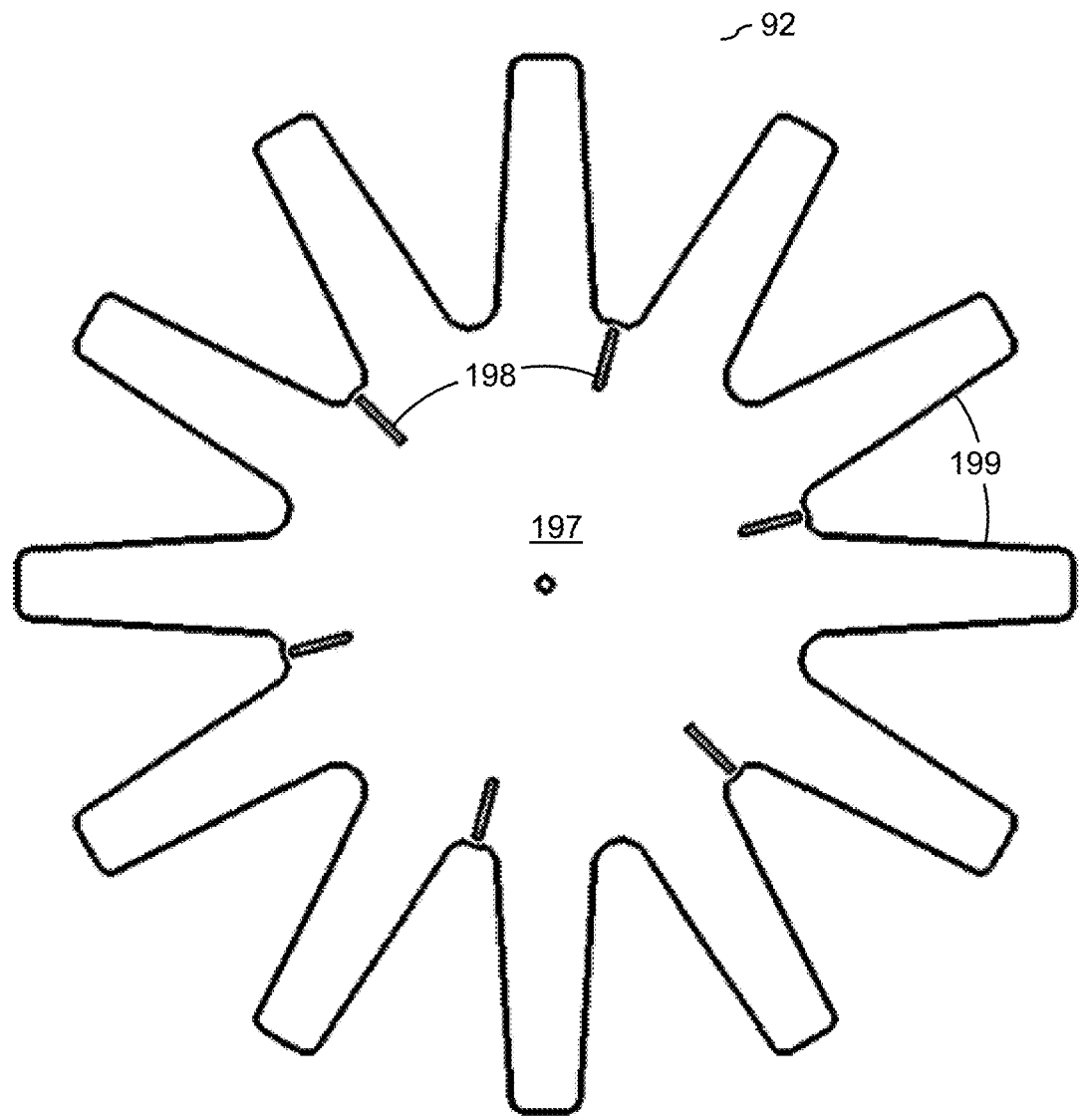
FIG. 20 is a front view of the second baffle plate of the heater of FIG. 14.

Referring to FIG. 20, a second baffle plate 92 includes a substantially solid hub 197, with radial slots 198 for receiving pins 196 and spokes 199 radiating from the solid hub 197. The spokes 199 are offset from the spokes 192 of the first baffle plate 92, so that air flowing between the spokes 192 hits the spokes 199, causing mixing of the air.

Figure 21:
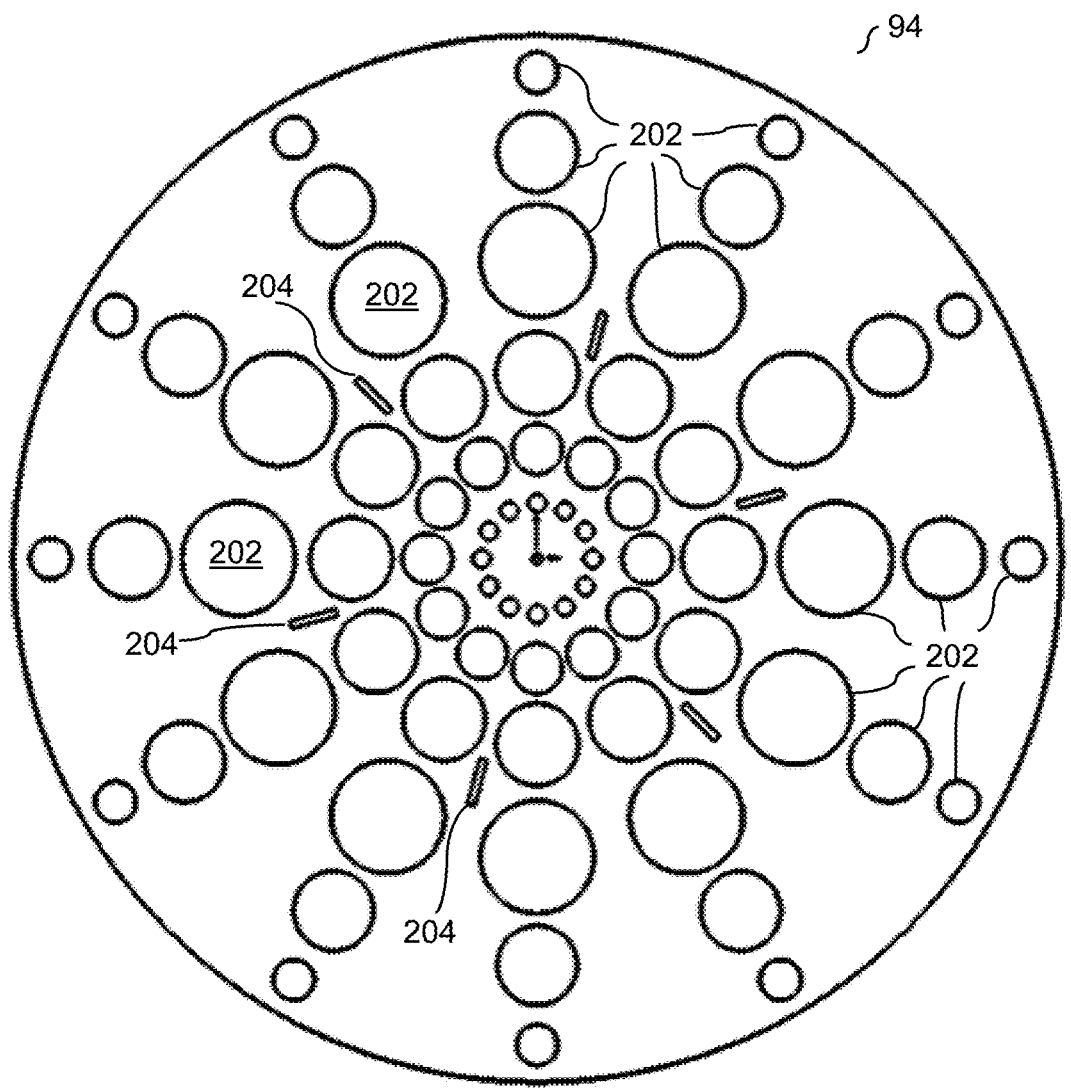
FIG. 21 is a front view of the third baffle plate of the heater of FIG. 14.

Referring to FIG. 21, a third baffle plate 94 comprises a disc having a pattern of openings 202 that align with the solid portions of the second baffle plate. The open areas of the second baffle plate 92 align with the solid portions of third baffle plate 94. The third baffle plate also includes radial slots 204 for receiving pins 196 to connect the third baffle plate 94 to the second baffle plate 92.

Figure 22:
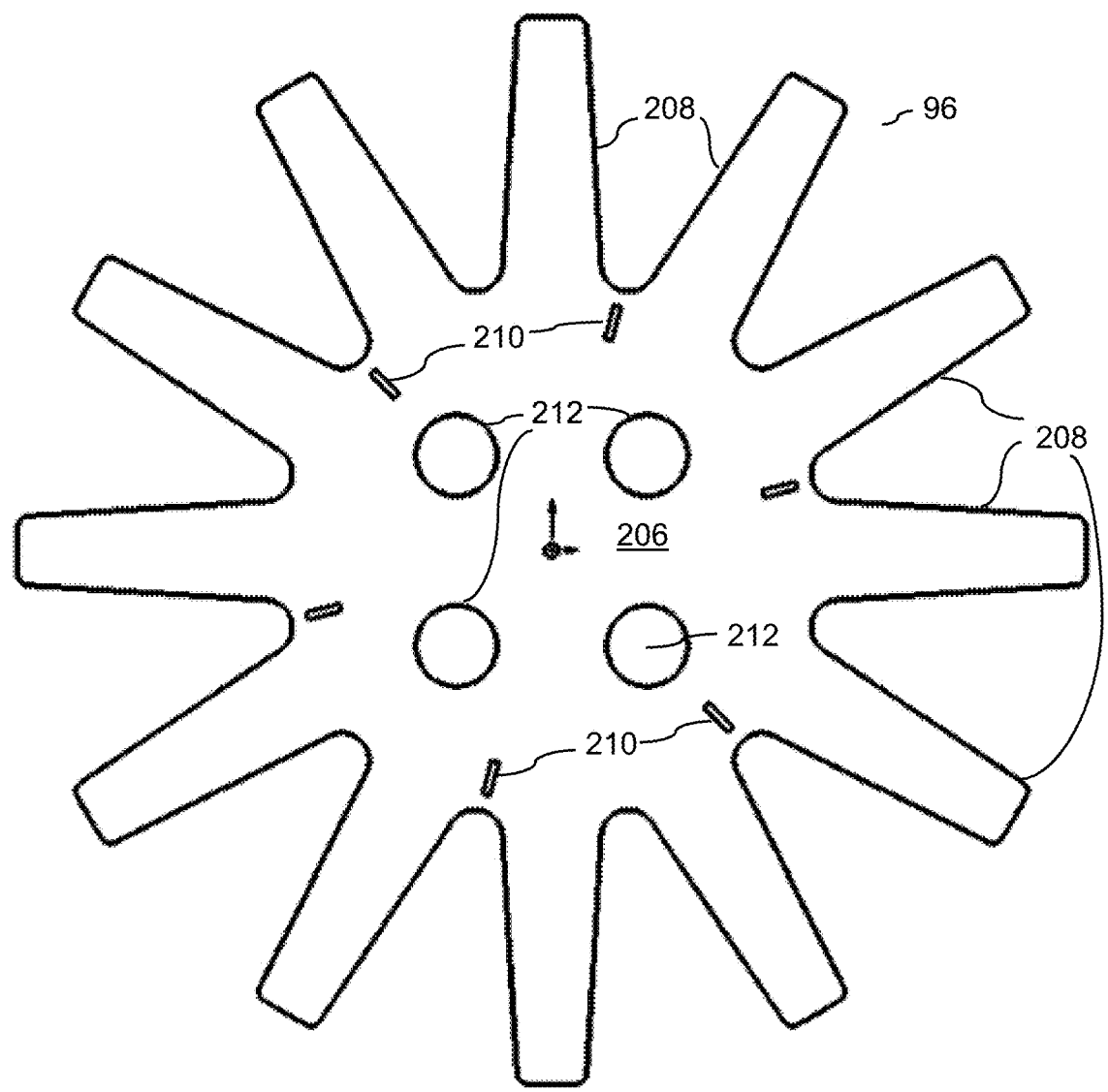
FIG. 22 is a front view of the fourth baffle plate of the heater of FIG. 14.

Referring to FIG. 22, a fourth baffle plate 96 comprises a central hub 206, radiating spokes 208, radial slots 210 and openings 212 in the hub 206. The openings 212 are arranged to overlap the solid portions of the third baffle plate 94.

Figure 23:
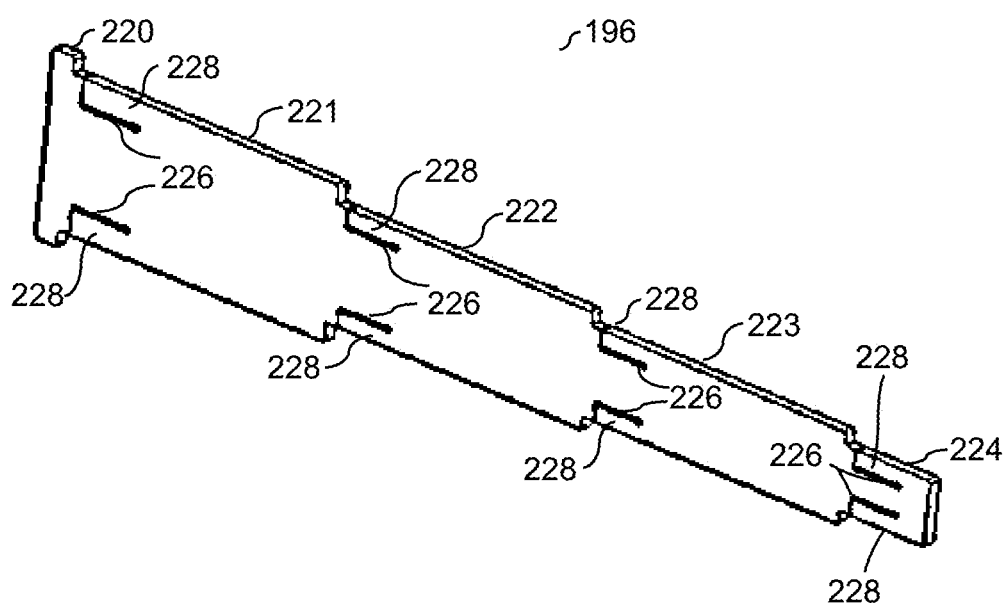
FIG. 23 is an isometric view of a connecting pin of the heater of FIG. 14.

The radial slots 195, 198, 204, 210 are aligned and sized progressively smaller to accommodate connecting pins 196. FIG. 23 shows an embodiment of a connecting pin 196 suitable for joining a plurality of heater components together. The pin 196 comprises a base 220 and a first connecting section 221 extending from the base. The first connecting section 221 is narrower than the base, so as to fit through radial slots 195 while the base 220 is larger than the radial slots. A second connecting section 222 extends from the first connecting section and is narrower than the first connecting section 221 so as to fit through the radial slots 198 of the second baffle plate 92. A third connecting section 223 extends from the second connecting section 222 and is narrower than the second connecting section so as to fit through the radial slots 204 of the third baffle plate 94. A tip 224 extends from the third connecting section 223 and is narrower than the third connecting section so as to fit through the radial slots 210 of the fourth baffle plate 96. Each connecting section includes upper and lower slits 226 forming locking tabs 228 near the step formed between each section.

Referring back to FIG. 16, the connecting pins 196 hold the baffle plates 90, 92, 94, 96 in position relative to each other. After insertion through a baffle plate, the associated locking tabs 228 are bent in opposite directions to lock the connecting pin relative to the baffle plate.

The other connecting pins 180 for connecting and spacing the heat barrier plate 86 and the air flow plate 76 also each includes a base, movable tabs and stepped down connecting sections to lock the air flow plate 76 to the heat barrier plate 86.

In one embodiment, the connecting pins 180, 196 and other components of the processor that are exposed to high temperatures may comprise a high-temperature metal, such as INCONEL®, available from Special Metals Corporation of New Hartford, NY. The connecting pins 180, 196 may be laser cut to form the desired shapes and configurations.

In one embodiment, a plurality of processors may be used together to pasteurize a product, such as almonds or other nuts. A first processor with an angled axial fan may receive raw almonds from an input, such as a hopper, and circulate warm air over the raw almonds as they are conveyed through the first processor, to pre-heat the almonds. The first processor passes the pre-heated almonds to a second processor having an angled axial fan, which uses steam and air combined and blown by the angled axial fan, to pasteurize the almonds as they are conveyed through the second processor. Then, the second processor can pass the pasteurized almonds to a third processor, which can used heated air circulated using an angled axial fan to dry the pasteurized nuts as they are conveyed through the third processor. Finally, a fourth processor, which can used cooled air

What is claimed is:

1. A bulk processor for a product, comprising:
a processing chamber having a product inlet and a product outlet;
a conveyor for conveying product through the processing chamber from the product inlet to the product outlet;
a fan for pulling air from below the conveyor and directing the air to a region above the conveyor; and
a heater for heating air circulated by the fan, the heater comprising:
a housing mounted outside of the processing chamber,
a flame tube extending from the housing through a side wall of the processing chamber into an interior of the processing chamber,
openings to allow air intake to the flame tube from outside the processing chamber,
an inner shroud surrounding the flame tube and having peripheral openings, and
an outer shroud surrounding the inner shroud.

2. The bulk processor of claim 1, wherein the heater further comprises a series of baffle plates between an outlet of the inner shroud and an outlet of the outer shroud for mixing air heated by the flame tube.

3. The bulk processor of claim 2, wherein each baffle plate comprises a pattern of openings and solid portions, wherein the openings in one baffle plate overlap solid portions of an adjacent baffle plate.

4. The bulk processor of claim 3, further comprising a plurality of connecting pins connecting the baffle plates together, each connecting pin comprising
a base disposed adjacent a first side of a first baffle plate,
a first narrowed connecting portion extending from the base through an opening in a first baffle plate to a second side of the first baffle plate towards a first side of a second baffle plate,
at least one tab extending from the first narrowed connecting portion on a second side of the first baffle plate to secure the connecting pin to the first baffle plate,
a second narrowed connecting portion extending from the first narrowed connecting portion through an opening in a second baffle plate, and
at least one tab extending from the second narrowed connecting portion on a second side of the second baffle plate to secure the second baffle plate to the connecting pin.

5. The bulk processor of claim 1, further comprising a plurality of baffles above the conveyor for mixing air in the region above the conveyor and directing an even flow of air over the conveyor.

6. The bulk processor of claim 1, wherein the fan comprises an axial flow fan having a curved back wall forming an air flow chamber.

7. The bulk processor of claim 6, wherein the axial flow fan is mounted in a door to the processing chamber, and the curved back wall extends outside of the door.

8. The bulk processor of claim 7, wherein the axial flow fan extends obliquely from the door into a lower portion of the processing chamber.

9. A heater for heating air, comprising:
a flame tube extending from a housing for combusting fuel to generate heat;
an inner shroud surrounding a first end of the flame tube and having peripheral openings;
an outer shroud surrounding the inner shroud; and
a series of baffle plates between an outlet of the inner shroud and an outlet of the outer shroud for mixing air heated by the flame tube.

10. The heater of claim 9, wherein each baffle plate comprises a pattern of openings and solid portions, wherein the openings in one baffle plate overlap solid portions of an adjacent baffle plate.

11. The heater of claim 10, further comprising a plurality of connecting pins connecting the baffle plates together, each connecting pin comprising
a base disposed adjacent a first side of a first baffle plate,
a first narrowed connecting portion extending from the base through an opening in a first baffle plate to a second side of the first baffle plate towards a first side of a second baffle plate,
at least one tab extending from the first narrowed connecting portion on a second side of the first baffle plate to secure the connecting pin to the first baffle plate,
a second narrowed connecting portion extending from the first narrowed connecting portion through an opening in a second baffle plate, and
at least one tab extending from the second narrowed connecting portion on a second side of the second baffle plate to secure the second baffle plate to the connecting pin.

12. The heater of claim 9, wherein the heater further comprises an air flow plate having a hub through which the flame tube protrudes and a plurality of flexible spokes connecting the hub to a peripheral rim.

13. The heater of claim 12, further comprising a heat barrier plate spaced inwards from the air flow plate and surrounding the first end of the flame tube to block heat emitted from the flame tube from passing towards the housing.

14. The heater of claim 13, further comprising an outer mounting plate that receives and connects the housing to the air flow plate, the outer mounting plate connected to and spaced from the air flow plate to create openings for air intake.

15. A bulk processor for a product, comprising:
a processing chamber having a product inlet and a product outlet;
a conveyor for conveying product through the processing chamber from the product inlet to the product outlet;
an axial fan extending into the processing chamber below the conveyor for pulling air from below the conveyor and directing the air to a region above the conveyor; and
a heater for heating air circulated by the axial fan, the heater comprising a natural gas burner with flow distributers mounted in a side wall of the processing chamber opposite an inlet to the axial fan.

16. The bulk processor of claim 15, wherein the axial fan is mounted in a base member forming a door to the processing chamber and extends obliquely from the base member into a lower portion of the processing chamber.

17. The bulk processor of claim 16, wherein the axial fan has a back wall that extends outside the base member of the door and forming an air flow chamber for directing air from the lower portion to an upper region above the conveyor.

18. The bulk processor of claim 17, wherein the back wall is curved and curves about 180° from a bottom of the door to a top of the door.

19. The bulk processor of claim 16, wherein the axial fan has a propeller comprising:
- a front hub plate facing the lower portion of the processing chamber, the front hub plate having a central opening for receiving an axle and a plurality of radiating petals,
- a rear hub plate having a central opening for receiving the axle and a plurality of radiating petals, and
- a plurality of radiating blades, each blade attached at a first side edge to a radiating petal of the front hub plate and attached at a second side edge to a radiating petal of the rear hub plate.

20. The bulk processor of claim 16, wherein the heater comprises:
- a housing mounted outside of the processing chamber,
- a flame tube extending from the housing through a side wall of the processing chamber into an interior of the processing chamber,
- openings to allow air intake to the flame tube from outside the processing chamber,
- an inner shroud surrounding the flame tube and having peripheral openings, and
- an outer shroud surrounding the inner shroud.

* * * * *